(12) United States Patent
Mehta et al.

(10) Patent No.: US 11,122,100 B2
(45) Date of Patent: Sep. 14, 2021

(54) DETECTING EVENTS FROM INGESTED DATA

(71) Applicant: Banjo, Inc., Park City, UT (US)

(72) Inventors: Rish Mehta, Redwood City, CA (US); Damien Patton, Park City, UT (US)

(73) Assignee: Banjo, Inc., South Jordan, UT (US)

(*) Notice: Subject to any disclaimer, the term of this patent is extended or adjusted under 35 U.S.C. 154(b) by 0 days.

(21) Appl. No.: 16/679,665

(22) Filed: Nov. 11, 2019

(65) Prior Publication Data

US 2020/0099731 A1 Mar. 26, 2020

Related U.S. Application Data

(63) Continuation of application No. 16/431,478, filed on Jun. 4, 2019, now Pat. No. 10,491,647, which is a continuation of application No. 16/390,297, filed on Apr. 22, 2019, now Pat. No. 10,447,750, which is a continuation of application No. 16/101,208, filed on Aug. 10, 2018, now Pat. No. 10,313,413.

(60) Provisional application No. 62/550,797, filed on Aug. 28, 2017.

(51) Int. Cl.
*G06F 15/16* (2006.01)
*H04L 29/06* (2006.01)
*G06F 9/50* (2006.01)
*G06F 9/54* (2006.01)

(52) U.S. Cl.
CPC ......... *H04L 65/601* (2013.01); *G06F 9/5027* (2013.01); *G06F 9/542* (2013.01)

(58) Field of Classification Search
CPC ....... H04L 65/601; G06F 9/5027; G06F 9/542
USPC .......................................................... 709/219
See application file for complete search history.

(56) References Cited

U.S. PATENT DOCUMENTS

| | | | |
|---|---|---|---|
| 6,493,633 B2 * | 12/2002 | Baron, Sr. ............ | G06Q 30/02 702/3 |
| 7,426,301 B2 | 9/2008 | Porikli | |
| 7,630,948 B2 | 12/2009 | Friedlander et al. | |
| 8,161,504 B2 | 4/2012 | Newell | |
| 8,208,798 B2 | 6/2012 | Jung et al. | |
| 8,265,400 B2 | 9/2012 | Yadid et al. | |
| 8,341,106 B1 | 12/2012 | Scolnicov et al. | |
| 8,380,050 B2 | 2/2013 | Kummer | |
| 8,396,467 B2 | 3/2013 | Bonnefoy et al. | |
| 8,515,565 B2 | 8/2013 | Smith et al. | |

(Continued)

OTHER PUBLICATIONS

A. M. MacEachren et al., "SensePlace2: GeoTwitter analytics support for situational awareness," 2011 IEEE Conference on Visual Analytics Science and Technology (VAST), 2011, pp. 181-190, doi: 10.1109/VAST.2011.6102456. (Year: 2011).*

(Continued)

*Primary Examiner* — Melvin H Pollack
(74) *Attorney, Agent, or Firm* — Dodd Law Group; Michael B. Dodd

(57) ABSTRACT

The present invention extends to methods, systems, and computer program products for detecting events from ingested data. Data is ingested. A first score is computed from a portion of the data. The first score indicates a likelihood of the data including event information. Computing resources are allocated to further process the data based on the first score indicating that further processing is warranted. A second score is computed from parameters of the data. An event is detected based on the second score.

20 Claims, 8 Drawing Sheets

(56) References Cited

U.S. PATENT DOCUMENTS

| | | | |
|---|---|---|---|
| 8,762,302 B1 | 6/2014 | Spivack et al. | |
| 8,782,041 B1 | 7/2014 | Daniel | |
| 8,825,823 B2 | 9/2014 | Keller, III et al. | |
| 8,914,471 B2 | 12/2014 | Pazos et al. | |
| 8,917,972 B2 | 12/2014 | Abraham et al. | |
| 8,938,089 B1 | 1/2015 | Postelnicu et al. | |
| 9,075,668 B1 | 7/2015 | Hushon et al. | |
| 9,077,956 B1 | 7/2015 | Morgan et al. | |
| 9,106,804 B2 | 8/2015 | Roberts et al. | |
| 9,128,995 B1* | 9/2015 | Fletcher | G06F 3/0481 |
| 9,146,962 B1* | 9/2015 | Boe | G06F 9/542 |
| 9,158,974 B1 | 10/2015 | Laska et al. | |
| 9,159,030 B1 | 10/2015 | Maennel | |
| 9,178,928 B2 | 11/2015 | Choi et al. | |
| 9,215,252 B2 | 12/2015 | Smith et al. | |
| 9,230,250 B1 | 1/2016 | Parker et al. | |
| 9,285,504 B2* | 3/2016 | Dannevik | G01W 1/00 |
| 9,324,093 B2 | 4/2016 | Setty et al. | |
| 9,363,280 B1 | 6/2016 | Rivlin et al. | |
| 9,374,282 B2 | 6/2016 | Feiten et al. | |
| 9,414,250 B2 | 8/2016 | Froehlich | |
| 9,419,917 B2* | 8/2016 | Eaton | H04L 47/785 |
| 9,443,002 B1 | 9/2016 | Freese et al. | |
| 9,449,229 B1 | 9/2016 | Laska et al. | |
| 9,461,876 B2* | 10/2016 | Van Dusen | G06N 5/02 |
| 9,466,196 B2 | 10/2016 | Smith et al. | |
| 9,466,197 B2 | 10/2016 | Hildick-Pytte | |
| 9,495,436 B2 | 11/2016 | Nivargi et al. | |
| 9,501,915 B1 | 11/2016 | Laska et al. | |
| 9,516,053 B1 | 12/2016 | Muddu et al. | |
| 9,591,300 B2 | 3/2017 | Djurdjevic | |
| 9,609,380 B2 | 3/2017 | Laska et al. | |
| 9,613,068 B2 | 4/2017 | Tsirogiannis et al. | |
| 9,614,963 B2* | 4/2017 | Maturana | G05B 19/058 |
| 9,654,445 B2 | 5/2017 | Stevens, IV et al. | |
| 9,680,919 B2 | 6/2017 | McDaid et al. | |
| 9,699,523 B1 | 7/2017 | Cronin et al. | |
| 9,703,827 B2 | 7/2017 | Clark et al. | |
| 9,703,974 B1 | 7/2017 | Surkatty | |
| 9,715,508 B1 | 7/2017 | Kish et al. | |
| 9,727,371 B2* | 8/2017 | Johnson | G06F 40/30 |
| 9,727,702 B2 | 8/2017 | Kass-Hout et al. | |
| 9,727,882 B1 | 8/2017 | Huntwork et al. | |
| 9,746,985 B1 | 8/2017 | Humayun et al. | |
| 9,753,913 B1 | 9/2017 | Kursun et al. | |
| 9,805,081 B2* | 10/2017 | Scott | G06F 16/23 |
| 9,858,124 B1 | 1/2018 | Ghare | |
| 9,858,322 B2 | 1/2018 | Theimer et al. | |
| 9,860,106 B2 | 1/2018 | Gerecke | |
| 9,880,769 B2 | 1/2018 | Chen et al. | |
| 9,892,168 B1 | 2/2018 | Apreleva et al. | |
| 9,898,542 B2 | 2/2018 | Hayden | |
| 9,917,874 B2 | 3/2018 | Luby et al. | |
| 9,934,513 B2* | 4/2018 | Cruickshank | G06Q 30/0205 |
| 9,936,238 B2 | 4/2018 | Grubbs et al. | |
| 9,940,580 B2 | 4/2018 | Faith et al. | |
| 9,947,022 B1* | 4/2018 | Shariff | G06Q 10/067 |
| 9,952,352 B2* | 4/2018 | Kirby | H04W 4/029 |
| 9,984,427 B2 | 5/2018 | Dave et al. | |
| 9,992,248 B2 | 6/2018 | Fox et al. | |
| 10,003,560 B1* | 6/2018 | Perkins | H04L 51/32 |
| 10,020,995 B2 | 7/2018 | Ricci et al. | |
| 10,025,653 B2 | 7/2018 | Goldstein et al. | |
| 10,028,646 B2 | 7/2018 | Gazdzinski | |
| 10,034,029 B1 | 7/2018 | Barua et al. | |
| 10,043,006 B2* | 8/2018 | Puri | G06F 21/552 |
| 10,043,551 B2 | 8/2018 | Anderson et al. | |
| 10,055,691 B2 | 8/2018 | Brand et al. | |
| 10,078,155 B2* | 9/2018 | Elkabetz | G01W 1/10 |
| 10,078,537 B1 | 9/2018 | Nanda et al. | |
| 10,079,721 B2 | 9/2018 | Nair et al. | |
| 10,142,386 B2 | 11/2018 | Gordon | |
| 10,146,592 B2 | 12/2018 | Bishop et al. | |
| 10,146,593 B2 | 12/2018 | Gong et al. | |
| 10,162,688 B2 | 12/2018 | Wagner | |
| 10,169,201 B2 | 1/2019 | Cook et al. | |
| 10,175,952 B2* | 1/2019 | Cook | G06F 8/60 |
| 10,177,958 B2 | 1/2019 | Wu et al. | |
| 10,185,807 B2 | 1/2019 | Pastore et al. | |
| 10,191,768 B2 | 1/2019 | Bishop et al. | |
| 10,193,384 B2 | 1/2019 | Brooks et al. | |
| 10,198,298 B2 | 2/2019 | Bishop et al. | |
| 10,204,123 B2 | 2/2019 | Dantas, Jr. | |
| 10,209,956 B2* | 2/2019 | Fletcher | H04L 41/069 |
| 10,226,303 B2 | 3/2019 | Wade et al. | |
| 10,235,683 B2* | 3/2019 | Milton | G06Q 30/0201 |
| 10,248,474 B2 | 4/2019 | Miller et al. | |
| 10,261,837 B2 | 4/2019 | Chen et al. | |
| 10,268,642 B1 | 4/2019 | Leung | |
| 10,268,660 B1 | 4/2019 | Arazi | |
| 10,296,192 B2 | 5/2019 | Stojanovic et al. | |
| 10,296,781 B2 | 5/2019 | Chan-Hon-Tong et al. | |
| 10,296,857 B2 | 5/2019 | Martin et al. | |
| 10,305,924 B2 | 5/2019 | Marquardt et al. | |
| 10,310,969 B2* | 6/2019 | Bhattacharjee | G06F 8/71 |
| 10,324,773 B2 | 6/2019 | Wing et al. | |
| 10,325,206 B2 | 6/2019 | Sanchez et al. | |
| 10,332,286 B2 | 6/2019 | Zamanakos et al. | |
| 10,333,965 B2* | 6/2019 | Gathala | H04W 12/1208 |
| 10,346,446 B2* | 7/2019 | League | B64G 1/1021 |
| 10,353,918 B2* | 7/2019 | Qi | G06F 16/27 |
| 10,354,169 B1* | 7/2019 | Law | G06K 9/209 |
| 10,356,146 B2 | 7/2019 | Ponekker et al. | |
| 10,361,802 B1* | 7/2019 | Hoffberg-Borghesani | G11B 27/11 |
| 10,366,096 B2* | 7/2019 | Ferrar | G06F 3/04842 |
| 10,379,842 B2 | 8/2019 | Malladi et al. | |
| 10,388,272 B1* | 8/2019 | Thomson | G10L 15/063 |
| 10,394,776 B2 | 8/2019 | Khan | |
| 10,404,732 B2 | 9/2019 | Munro et al. | |
| 10,409,665 B2 | 9/2019 | Steiner et al. | |
| 10,424,219 B2 | 9/2019 | Simpson et al. | |
| 10,438,072 B2 | 10/2019 | Singh | |
| 10,445,062 B2 | 10/2019 | Oberbreckling et al. | |
| 10,476,898 B2 | 11/2019 | Muddu et al. | |
| 10,489,817 B2* | 11/2019 | Perkins | G06Q 30/0242 |
| 10,528,794 B2* | 1/2020 | Koskan | G06F 16/00 |
| 10,534,784 B2* | 1/2020 | Cousins | G06F 17/18 |
| 10,581,897 B1 | 3/2020 | Natanzon et al. | |
| 10,585,724 B2* | 3/2020 | Patton | G08B 21/182 |
| 10,594,759 B2 | 3/2020 | Paduroiu | |
| 10,600,295 B2* | 3/2020 | Kempel | G08B 13/19608 |
| 10,614,066 B2* | 4/2020 | Gawande | H04L 67/10 |
| 10,659,509 B2 | 5/2020 | Zamaraiev et al. | |
| 10,678,233 B2 | 6/2020 | Cella et al. | |
| 10,681,060 B2 | 6/2020 | Scheidler et al. | |
| 10,701,094 B2* | 6/2020 | Kirti | H04W 12/0806 |
| 10,719,360 B2* | 7/2020 | Srinivasan | G06F 9/5072 |
| 10,860,618 B2* | 12/2020 | Cruise | G06F 11/3452 |
| 10,866,980 B2* | 12/2020 | Rogynskyy | G06F 16/24564 |
| 10,866,991 B1* | 12/2020 | Boe | G06F 3/04842 |
| 10,942,946 B2* | 3/2021 | Oliner | G06F 16/213 |
| 10,984,913 B2* | 4/2021 | Shah | G06F 16/951 |
| 10,990,611 B1* | 4/2021 | Singh | G06F 7/76 |
| 10,997,244 B2* | 5/2021 | Russell | G06F 16/9024 |
| 2003/0036683 A1 | 2/2003 | Kehr et al. | |
| 2003/0093580 A1 | 5/2003 | Thomas et al. | |
| 2004/0113933 A1 | 6/2004 | Guler | |
| 2005/0183143 A1 | 8/2005 | Anderholm et al. | |
| 2006/0235833 A1 | 10/2006 | Smith et al. | |
| 2006/0267783 A1 | 11/2006 | Smith | |
| 2008/0319335 A1 | 12/2008 | Greene | |
| 2010/0057736 A1 | 3/2010 | Srinivasan et al. | |
| 2010/0166309 A1 | 7/2010 | Hull | |
| 2011/0040760 A1 | 2/2011 | Fleischman et al. | |
| 2011/0211737 A1 | 9/2011 | Krupka et al. | |
| 2011/0311140 A1 | 12/2011 | Urbach et al. | |
| 2012/0023245 A1 | 1/2012 | Mouquet et al. | |
| 2012/0131139 A1 | 5/2012 | Siripurapu et al. | |
| 2012/0259842 A1 | 10/2012 | Oman et al. | |
| 2013/0006627 A1 | 1/2013 | Guthery et al. | |
| 2013/0018896 A1 | 1/2013 | Fleischman et al. | |
| 2013/0083036 A1 | 4/2013 | Cario et al. | |
| 2013/0214925 A1 | 8/2013 | Weiss | |

(56) References Cited

U.S. PATENT DOCUMENTS

| | | |
|---|---|---|
| 2013/0317765 A1 | 11/2013 | Rao et al. |
| 2014/0025781 A1 | 1/2014 | Ye et al. |
| 2014/0067951 A1 | 3/2014 | Sheinfeld |
| 2014/0085328 A1 | 3/2014 | Codella et al. |
| 2014/0088744 A1 | 3/2014 | Levien et al. |
| 2014/0095425 A1 | 4/2014 | Sipple et al. |
| 2014/0258469 A1 | 9/2014 | Maharajh et al. |
| 2014/0304262 A1 | 10/2014 | Makki et al. |
| 2014/0328570 A1 | 11/2014 | Cheng et al. |
| 2014/0330749 A1* | 11/2014 | Candas ............... G06Q 40/06 705/36 R |
| 2014/0351046 A1 | 11/2014 | Carlyle et al. |
| 2015/0095333 A1 | 4/2015 | Porpora |
| 2015/0134626 A1 | 5/2015 | Theimer et al. |
| 2015/0134684 A1* | 5/2015 | Montana ............. H04L 67/2819 707/758 |
| 2015/0220835 A1 | 8/2015 | Wilson et al. |
| 2015/0234570 A1 | 8/2015 | Hampson et al. |
| 2015/0269244 A1* | 9/2015 | Qamar ............. G06Q 10/06398 705/7.42 |
| 2015/0294233 A1 | 10/2015 | Aultman et al. |
| 2015/0339263 A1 | 11/2015 | Abu El Ata et al. |
| 2015/0348591 A1 | 12/2015 | Kaps et al. |
| 2015/0363693 A1 | 12/2015 | Caplan et al. |
| 2016/0078362 A1 | 3/2016 | Christodorescu et al. |
| 2016/0135706 A1 | 5/2016 | Sullivan et al. |
| 2016/0139242 A1 | 5/2016 | Dupray et al. |
| 2016/0162512 A1 | 6/2016 | Battistini et al. |
| 2016/0192166 A1 | 6/2016 | deCharms |
| 2016/0210367 A1 | 7/2016 | Yamada et al. |
| 2016/0220169 A1 | 8/2016 | Girouard |
| 2016/0239713 A1 | 8/2016 | Stone et al. |
| 2016/0267144 A1 | 9/2016 | Manimaran |
| 2016/0283860 A1 | 9/2016 | Pycock et al. |
| 2016/0314185 A1 | 10/2016 | Buchanan et al. |
| 2016/0328661 A1 | 11/2016 | Reese et al. |
| 2016/0356666 A1 | 12/2016 | Bilal et al. |
| 2016/0364963 A1 | 12/2016 | Matsuoka et al. |
| 2017/0011053 A1 | 1/2017 | Hubbard et al. |
| 2017/0013032 A1 | 1/2017 | Lakos et al. |
| 2017/0032138 A1 | 2/2017 | Navda et al. |
| 2017/0055913 A1 | 3/2017 | Bandyopadhyay et al. |
| 2017/0060574 A1 | 3/2017 | Malladi et al. |
| 2017/0075995 A1 | 3/2017 | Fleischman et al. |
| 2017/0076217 A1 | 3/2017 | Krumm et al. |
| 2017/0115648 A1 | 4/2017 | Nixon et al. |
| 2017/0139393 A1 | 5/2017 | Boss et al. |
| 2017/0139956 A1 | 5/2017 | Qiao et al. |
| 2017/0142200 A1 | 5/2017 | Kodner et al. |
| 2017/0161443 A1 | 6/2017 | Bassham et al. |
| 2017/0180944 A1 | 6/2017 | Bhatt |
| 2017/0235848 A1* | 8/2017 | Van Dusen ........... G06F 16/904 705/12 |
| 2017/0257654 A1 | 9/2017 | Branch et al. |
| 2017/0262697 A1 | 9/2017 | Kaps et al. |
| 2017/0279840 A1 | 9/2017 | Zhang et al. |
| 2017/0279957 A1 | 9/2017 | Abramson et al. |
| 2017/0284839 A1 | 10/2017 | Ojala |
| 2017/0289650 A1 | 10/2017 | Schattmaier et al. |
| 2017/0308678 A1 | 10/2017 | Apreleva et al. |
| 2017/0318336 A1 | 11/2017 | Hackett et al. |
| 2017/0366896 A1 | 12/2017 | Adsumilli et al. |
| 2018/0014103 A1 | 1/2018 | Martin et al. |
| 2018/0027006 A1* | 1/2018 | Zimmermann ........... G06F 9/46 726/11 |
| 2018/0077188 A1* | 3/2018 | Mandyam ............... H04L 67/42 |
| 2018/0097762 A1 | 4/2018 | Garcia et al. |
| 2018/0101595 A1 | 4/2018 | Bastide et al. |
| 2018/0110416 A1 | 4/2018 | Masuda et al. |
| 2018/0114130 A1 | 4/2018 | Rana et al. |
| 2018/0121254 A1 | 5/2018 | Ghare |
| 2018/0172454 A1 | 6/2018 | Ghadiok et al. |
| 2018/0176607 A1 | 6/2018 | Shaw et al. |
| 2018/0181713 A1 | 6/2018 | Pillarisetty et al. |
| 2018/0189367 A1 | 7/2018 | Theimer et al. |
| 2018/0192158 A1 | 7/2018 | Smith et al. |
| 2018/0203744 A1 | 7/2018 | Wiesmaier et al. |
| 2018/0225687 A1 | 8/2018 | Ahmed et al. |
| 2018/0247382 A1 | 8/2018 | Taniguchi et al. |
| 2018/0262783 A1 | 9/2018 | Yang et al. |
| 2018/0268868 A1 | 9/2018 | Salokannel et al. |
| 2018/0276054 A1 | 9/2018 | Furuichi et al. |
| 2018/0287797 A1 | 10/2018 | Banerjee et al. |
| 2018/0288298 A1 | 10/2018 | Lim |
| 2018/0300124 A1 | 10/2018 | Malladi et al. |
| 2018/0308569 A1 | 10/2018 | Luellen |
| 2018/0313798 A1 | 11/2018 | Chokshi et al. |
| 2018/0315499 A1 | 11/2018 | Appelbaum et al. |
| 2018/0324239 A1 | 11/2018 | Powis et al. |
| 2018/0332367 A1 | 11/2018 | Kaitchuck et al. |
| 2018/0336892 A1 | 11/2018 | Kim et al. |
| 2018/0366221 A1 | 12/2018 | Crehoe et al. |
| 2018/0376177 A1 | 12/2018 | Nugent et al. |
| 2019/0012374 A1* | 1/2019 | Petroni ............... G06F 16/9537 |
| 2019/0012734 A1 | 1/2019 | Cruttenden et al. |
| 2019/0028775 A1 | 1/2019 | Chakra et al. |
| 2019/0033351 A1 | 1/2019 | Takata et al. |
| 2019/0034475 A1 | 1/2019 | Parikh et al. |
| 2019/0042933 A1* | 2/2019 | Powell .................... G06N 20/00 |
| 2019/0068627 A1* | 2/2019 | Thampy ............... H04L 63/1425 |
| 2019/0082044 A1 | 3/2019 | Melendez et al. |
| 2019/0095478 A1* | 3/2019 | Tankersley .......... G06F 16/2379 |
| 2019/0138524 A1 | 5/2019 | Singh et al. |
| 2019/0138641 A1 | 5/2019 | Pal et al. |
| 2019/0141377 A1 | 5/2019 | Loheide et al. |
| 2019/0141394 A1 | 5/2019 | Loheide et al. |
| 2019/0147086 A1 | 5/2019 | Pal et al. |
| 2019/0155533 A1 | 5/2019 | Das et al. |
| 2019/0156826 A1 | 5/2019 | Cromack |
| 2019/0166386 A1 | 5/2019 | Bamich et al. |
| 2019/0172564 A1* | 6/2019 | Chandra ................. G06N 20/00 |
| 2019/0174207 A1 | 6/2019 | Cella et al. |
| 2019/0182554 A1 | 6/2019 | Schupak et al. |
| 2019/0226898 A1* | 7/2019 | Gray, Jr. ................ H04W 84/18 |
| 2019/0265971 A1 | 8/2019 | Behzadi et al. |
| 2019/0272925 A1* | 9/2019 | Barrett .................... G16H 50/80 |
| 2019/0311372 A1* | 10/2019 | Lindner ................. G06Q 30/01 |
| 2019/0340684 A1 | 11/2019 | Belanger et al. |
| 2019/0349321 A1 | 11/2019 | Cai et al. |
| 2019/0355082 A1 | 11/2019 | McMillan et al. |
| 2019/0394259 A1 | 12/2019 | Park et al. |
| 2020/0042947 A1* | 2/2020 | Rakshit ................... G06Q 10/02 |
| 2020/0067789 A1 | 2/2020 | Khuti et al. |
| 2020/0294642 A1* | 9/2020 | Bostic .................... G06Q 40/08 |
| 2021/0019327 A1* | 1/2021 | Reynolds .............. G06F 16/215 |
| 2021/0026030 A1* | 1/2021 | Dixon ...................... G01V 1/50 |
| 2021/0081477 A1* | 3/2021 | Tibbet .................. G06F 16/2465 |
| 2021/0090694 A1* | 3/2021 | Colley ................... G16H 20/40 |
| 2021/0109904 A1* | 4/2021 | Kasi ...................... G06F 16/273 |

OTHER PUBLICATIONS

Lombardo, J., Burkom, H., Elbert, E. et al. A systems overview of the Electronic Surveillance System for the Early Notification of Community-Based Epidemics (Essence II). J Urban Health 80, i32-i42 (2003). https://doi.org/10.1007/PL00022313 (Year: 2003).*

Tian, Yi., Brown, L., Hampapur, A. et al. IBM smart surveillance system (S3): event based video surveillance system with an open and extensible framework. Machine Vision and Applications 19, 315-327 (2008). https://doi.org/10.1007/s00138-008-0153-z (Year: 2008).*

Osborne, M. et al. (Jun. 2014). Real-time detection, tracking, and monitoring of automatically discovered events in social media. In Proceedings of 52nd annual meeting of the association for computational linguistics: system demonstrations (pp. 37-42). (Year: 2014).*

Avvenuti, M., Cresci, S., Del Vigna, F. et al. CrisMap: a Big Data Crisis Mapping System Based on Damage Detection and Geoparsing. Inf Syst Front 20, 993-1011 (2018). https://doi.org/10.1007/s10796-018-9833-z (Year: 2018).*

Goswami, A., & Kumar, A. (2016). A survey of event detection techniques in online social networks. Social Network Analysis and Mining, 6(1), 1-25. (Year: 2016).*

(56) References Cited

OTHER PUBLICATIONS

Abhijit Suprem and Calton Pu. 2019. ASSED: A Framework for Identifying Physical Events through Adaptive Social Sensor Data Filtering. In Proceedings of the 13th ACM International Conference on Distributed and Event-based Systems (DEBS '19). Association for Computing Machinery, NY, 115-126. (Year: 2019).*
Office Action received in U.S. Appl. No. 16/121,917, dated Nov. 2, 2018, 20 pages.
Office Action received in U.S. Appl. No. 16/131,637, dated Nov. 28, 2018, 37 pages.
Office Action received in U.S. Appl. No. 16/106,530, dated Oct. 26, 2018, 15 pages.
Office Action received in U.S. Appl. No. 16/038,537, dated Oct. 19, 2018, 10 pages.
Office Action received in U.S. Appl. No. 16/106,436, dated Nov. 8, 2018, 15 pages.
Office Action received in U.S. Appl. No. 16/121,762, dated Nov. 19, 2018, 12 pages.
Office Action received in U.S. Appl. No. 16/121,847, dated Nov. 23, 2018, 39 pages.
Office Action received in U.S. Appl. No. 16/394,620, dated Jun. 12, 2019, 25 pages.
Office Action received in U.S. Appl. No. 16/396,454, dated Jun. 28, 2019, 14 pages.
Office Action received in U.S. Appl. No. 16/101,208, dated Nov. 14, 2018, 14 pages.
Nirjon, et al., Auditeur: A Mobile-Cloud Service Platform for Acoustic Event Detection on Smartphones, Jun. 25-28, 2013, 14 pages.
Office Action received in U.S. Appl. No. 16/379,401, dated May 15, 2019, 22 pages.
Office Action received in U.S. Appl. No. 16/285,031, dated Apr. 17, 2019, 11 pages.
Office Action received in U.S. Appl. No. 16/511,720, dated Sep. 12, 2019, 13 pages.
Office Action received in U.S. Appl. No. 16/839,648, dated Aug. 7, 2020, 16 pages.
Sheikh et al. "Quality-of-context and its use for protecting privacy in context aware systems." JSW 3.3, Mar. 2008; 11 pages.
Lin et al. "Semantics-preserving hashing for cross-view retrieval." Proceedings of the IEEE conference on computer vision and pattern recognition; 2015; 9 pages.
Office Action received in U.S. Appl. No. 16/836,237, dated Jun. 16, 2020, 24 pages.

* cited by examiner

DETECTING EVENTS FROM INGESTED DATA

CROSS-REFERENCE TO RELATED APPLICATIONS

This application is a Continuation of U.S. patent application Ser. No. 16/431,478, entitled "Detecting An Event From An Ingested Video Signal", filed Jun. 4, 2019, which is incorporated herein in its entirety. That application is a Continuation of U.S. patent application Ser. No. 16/390,297, now U.S. Pat. No. 10,447,750, entitled "Detecting Events From Ingested Communication Signals", filed Apr. 22, 2019, which is incorporated herein in its entirety. That application is a Continuation of U.S. patent application Ser. No. 16/101,208, now U.S. Pat. No. 10,313,413, entitled "Detecting Events From Ingested Communication Streams", filed Aug. 10, 2018, which is incorporated herein in its entirety. That application claims the benefit of U.S. Provisional Patent Application Ser. No. 62/550,797, entitled "Event Detection System and Method", filed Aug. 28, 2017, which is incorporated herein in its entirety.

This application is related to U.S. Provisional Patent Application Ser. No. 62/664,001, entitled "Normalizing Different Types Of Ingested Signals Into A Common Format", filed Apr. 27, 2018, which is incorporated herein in its entirety. This application is related to U.S. Provisional Patent Application Ser. No. 62/667,616, entitled "Normalizing Different Types Of Ingested Signals Into A Common Format", filed May 7, 2018, which is incorporated herein in its entirety. This application is related to U.S. Provisional Patent Application Ser. No. 62/686,791 entitled, "Normalizing Signals", filed Jun. 19, 2018, which is incorporated herein in its entirety.

BACKGROUND

1. Background and Relevant Art

Data provided to computer systems can come from any number of different sources, such as, for example, user input, files, databases, applications, sensors, social media systems, cameras, emergency communications, etc. In some environments, computer systems receive (potentially large volumes of) data from a variety of different domains and/or verticals in a variety of different formats. When data is received from different sources and/or in different formats, it can be difficult to efficiently and effectively derive intelligence from the data.

Extract, transform, and load (ETL) refers to a technique that extracts data from data sources, transforms the data to fit operational needs, and loads the data into an end target. ETL systems can be used to integrate data from multiple varied sources, such as, for example, from different vendors, hosted on different computer systems, etc.

ETL is essentially an extract and then store process. Prior to implementing an ETL solution, a user defines what (e.g., subset of) data is to be extracted from a data source and a schema of how the extracted data is to be stored. During the ETL process, the defined (e.g., subset of) data is extracted, transformed to the form of the schema (i.e., schema is used on write), and loaded into a data store. To access different data from the data source, the user has to redefine what data is to be extracted. To change how data is stored, the user has to define a new schema.

ETL is beneficially because it allows a user to access a desired portion of data in a desired format. However, ETL can be cumbersome as data needs evolve. Each change to the extracted data and/or the data storage results in the ETL process having to be restarted. Further, ETL can be difficult to implement with streaming data types.

BRIEF SUMMARY

Examples extend to methods, systems, and computer program products for detecting events from ingested data. Data is ingested. A first score is computed from a portion of the data. The first score indicates a likelihood of the data including event information related to an event type.

It is determined that further processing of the data is warranted based on the likelihood indicated by the first score. Computing resources are allocated to further process the data. A second score is computed from parameters of the data utilizing the allocated computing resources. A previously unidentified event of the event type is detected based on the second score.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by practice. The features and advantages may be realized and obtained by means of the instruments and combinations particularly pointed out in the appended claims. These and other features and advantages will become more fully apparent from the following description and appended claims, or may be learned by practice as set forth hereinafter.

BRIEF DESCRIPTION OF THE DRAWINGS

In order to describe the manner in which the above-recited and other advantages and features can be obtained, a more particular description will be rendered by reference to specific implementations thereof which are illustrated in the appended drawings. Understanding that these drawings depict only some implementations and are not therefore to be considered to be limiting of its scope, implementations will be described and explained with additional specificity and detail through the use of the accompanying drawings in which.

DETAILED DESCRIPTION

Figure 1A:
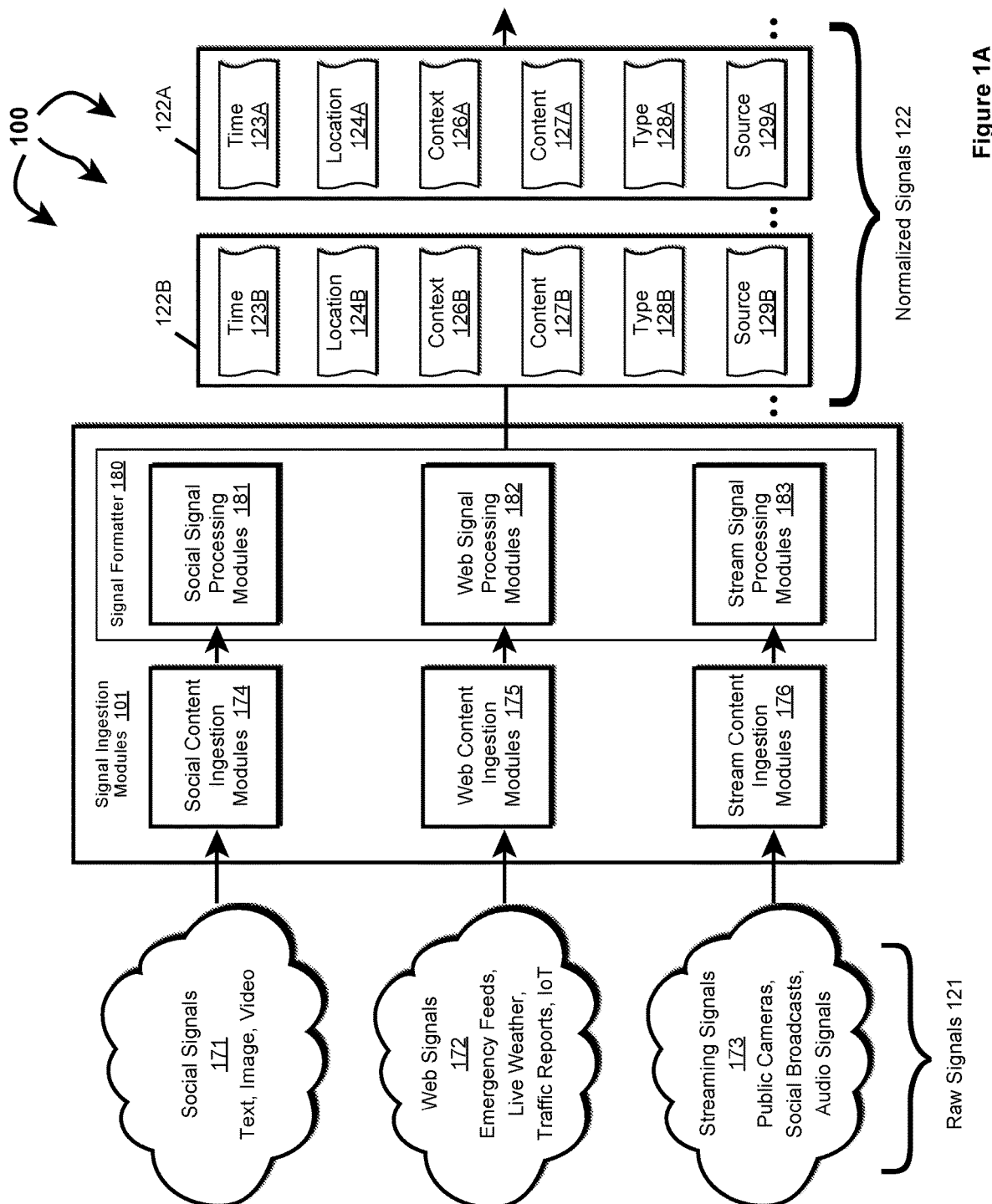
FIG. 1A illustrates an example computer architecture that facilitates normalizing ingesting signals.

Examples extend to methods, systems, and computer program products for detecting events from ingested communication streams.

Entities (e.g., parents, other family members, guardians, friends, teachers, social workers, first responders, hospitals, delivery services, media outlets, government entities, etc.) may desire to be made aware of relevant events as close as possible to the events' occurrence (i.e., as close as possible to "moment zero"). Different types of ingested signals (e.g., social media signals, web signals, and streaming signals) can be used to detect events. Aspects of the invention ingest and process a plurality of audio streams, such as audio streams from communication channels used by local municipalities, counties, states, countries, or other regional subdivisions. Signal ingestion and processing can be performed in real- or near-real time (e.g., with no or near-zero latency), but can alternatively or additionally be performed asynchronously from audio stream generation or receipt.

More particularly, in one aspect, an event is detected based on characteristics of a communication (e.g., audio) stream. For example, an emergency event of interest, such as a shooting, bombing, riot, or other emergency event, that has (or will) occur is detected based on analysis of emergency communications. In another example, logistical parameters (e.g., location, time, operating context, etc.) are determined for each operator within an operator fleet. Event parameters, such as the event location (e.g., specific geolocation, geographic region, etc.), the event time (e.g., start and/or stop), the event severity, event participants, or any other suitable parameter can also be determined. These event parameters can be fed into an event detection system that can be used to: gather additional information about the event, to notify entities, such as emergency personnel, security personnel, financial institutions, or other entities interested in the event, to reroute fleet vehicles, etc.

A variety of challenges arise when processing streaming communication channels. A relatively large amount of computing resources (e.g., uptime and power) are consumed to continually monitor and analyze all communication on a single communication channel. Resource consumption scales directly with the number of communication channels monitored and becomes commercially and technically unfeasible after a threshold number of communication channels are ingested. Further, different jurisdictions, corporations, etc. can use different syntax, vocabulary, and/or language from other jurisdictions, corporations, etc., which reduces or eliminates the ability to process multiple communication channels using the same processes (and further increasing the amount of required computing resources).

Communications on said channels also tend to be noisy, which decrease the quality of the event signal extracted from said communications. Additionally, a single communication channel can concurrently have multiple ongoing conversations (e.g., between the dispatcher and multiple field operators), which may need to be separated out for event analysis. Furthermore, not all of the conversations are relevant (e.g., about an event). For example, some conversations may be idle banter, while others may be about low-level incidents that do not rise to the level of an event.

Aspects of the invention mitigate, reduce, and potentially fully resolve one or more of the described challenges. A smaller portion of a streaming communication signal, for example, a clip or sub-clip, is examined. Based on the likelihood of the smaller portion containing event related information, a decision is made whether to examine the streaming communication signal more thoroughly. That is, a less resource intensive examination of a streaming communication signal is performed to estimate the benefit of performing a subsequent more resource intensive examination of the streaming communication signal.

For example, aspects can decrease computing resource consumption by identifying and analyzing communication clips (as opposed to larger portions of a streaming communication signal). This minimizes compute power by reducing the volume of data to be analyzed (e.g., a subset of the audio stream instead of the entire audio stream). Additionally, or alternatively, computing resource consumption is decreased by pre-evaluating communication clips from a streaming communication signal for an event content probability. The event content probability can then be used to determine the potential benefit of more thoroughly examining the streaming communication signal.

Examining communication clips also conserves compute power and time resources by limiting application of resource-intensive processes (e.g., signal interpretation, voice recognition, NLP, etc.) to a subset of communication clips with a higher probability of having event-associated content. Additionally, or alternatively, computing resource consumption is reduced by leveraging standardized syntax for each jurisdiction, corporation, communication channel, or dispatcher. Processing of streaming communication signals can focus on the portion of the audio clip with the highest probability of having an event identifier (e.g., event code which gives an indication of whether the clip is about an event, the event type, and/or event severity).

Different analysis modules can be used for each communication channel. Using different analysis modules increases the processing speed of each communication stream, since smaller, lighter-weight modules can be used for each clip analysis instead of using a larger, slower module that accommodates nuances of multiple communication channels. In one example, each communication channel can be associated with its own module(s) that identifies the event identifier clip or sub-clip, extracts event parameters from the clip or sub-clip, or performs any other analysis. These modules are preferably trained on historic communication clips from the respective communication channel but can be trained using other communication clips or otherwise trained.

Noise-reduction processes can be applied on the communication streams before the clips are identified, which functions to clean up the subsequently processed signal. For example, the system and method can remove white noise, static, scratches, pops, chirps, or other features prior to clip analysis. Conversation analysis (e.g., NLP analysis), voice recognition, or other techniques to can be applied to stitch together different conversations on the same communication channel.

In general, signal ingestion modules ingest different types of raw structured and/or raw unstructured signals on an ongoing basis. Different types of signals can include different data media types and different data formats. Data media types can include audio, video, image, and text. Different formats can include text in XML, text in JavaScript Object Notation (JSON), text in RSS feed, plain text, video stream in Dynamic Adaptive Streaming over HTTP (DASH), video stream in HTTP Live Streaming (HLS), video stream in Real-Time Messaging Protocol (RTMP), other Multipurpose Internet Mail Extensions (MIME) types, audio stream in Free Lossless Audio Codec ("FLAC"), audio stream in Waveform Audio File Format (WAV), audio stream in Apple Lossless Audio Codec ("ALAC") etc. Handling different types and formats of data introduces inefficiencies into subsequent event detection processes, including when determining if different signals relate to the same event.

Accordingly, the signal ingestion modules can normalize raw signals across multiple data dimensions to form normalized signals. Each dimension can be a scalar value or a vector of values. In one aspect, raw signals are normalized into normalized signals having a Time, Location, Context (or "TLC") dimensions.

A Time (T) dimension can include a time of origin or alternatively a "event time" of a signal. A Location (L) dimension can include a location anywhere across a geographic area, such as, a country (e.g., the United States), a State, a defined area, an impacted area, an area defined by a geo cell, an address, etc.

A Context (C) dimension indicates circumstances surrounding formation/origination of a raw signal in terms that facilitate understanding and assessment of the raw signal. The Context (C) dimension of a raw signal can be derived from express as well as inferred signal features of the raw signal.

Signal ingestion modules can include one or more single source classifiers. A single source classifier can compute a single source probability for a raw signal from features of the raw signal. A single source probability can reflect a mathematical probability or approximation of a mathematical probability (e.g., a percentage between 0%-100%) of an event actually occurring. A single source classifier can be configured to compute a single source probability for a single event type or to compute a single source probability for each of a plurality of different event types. A single source classifier can compute a single source probability using artificial intelligence, machine learning, neural networks, logic, heuristics, etc.

As such, single source probabilities and corresponding probability details can represent a Context (C) dimension. Probability details can indicate (e.g., can include a hash field indicating) a probabilistic model and (express and/or inferred) signal features considered in a signal source probability calculation.

Thus, per signal type, signal ingestion modules determine Time (T), a Location (L), and a Context (C) dimensions associated with a signal. Different ingestion modules can be utilized/tailored to determine T, L, and C dimensions associated with different signal types. Normalized (or "TLC") signals can be forwarded to an event detection infrastructure. When signals are normalized across common dimensions subsequent event detection is more efficient and more effective.

Normalization of ingestion signals can include dimensionality reduction. Generally, "transdimensionality" transformations can be structured and defined in a "TLC" dimensional model. Signal ingestion modules can apply the "transdimensionality" transformations to generic source data in raw signals to re-encode the source data into normalized data having lower dimensionality. Thus, each normalized signal can include a T vector, an L vector, and a C vector. At lower dimensionality, the complexity of measuring "distances" between dimensional vectors across different normalized signals is reduced.

Concurrently with signal ingestion, an event detection infrastructure considers features of different combinations of normalized signals to attempt to identify events of interest to various parties. For example, the event detection infrastructure can determine that features of multiple different normalized signals collectively indicate an event of interest to one or more parties. Alternately, the event detection infrastructure can determine that features of one or more normalized signals indicate a possible event of interest to one or more parties. The event detection infrastructure then determines that features of one or more other normalized signals validate the possible event as an actual event of interest to the one or more parties. Signal features can include: signal type, signal source, signal content, Time (T) dimension, Location (L) dimension, Context (C) dimension, other circumstances of signal creation, etc.

In one aspect, streaming communication signals are received on one or more communication channels. Characteristics of the streaming communication signals can be used (potentially in combination with other signals) to detect events.

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: raw signals, streaming signals, communication signals, audio signals, normalized signals, search terms, geo cell subsets, events, clips, sub-clips, clip scores, event identifiers, parameters, event scores, probabilities, notifications, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, raw signals, streaming signals, communication signals, audio signals, normalized signals, search terms, geo cell subsets, events, clips, sub-clips, clip scores, event identifiers, parameters, event scores, probabilities, notifications, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for a higher speed detection or artificial intelligence that can enable signal processing. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can be composed of various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

In this description and the following claims, a "geo cell" is defined as a piece of "cell" in a spatial grid in any form. In one aspect, geo cells are arranged in a hierarchical structure. Cells of different geometries can be used.

A "geohash" is an example of a "geo cell".

In this description and the following claims, "geohash" is defined as a geocoding system which encodes a geographic location into a short string of letters and digits. Geohash is a hierarchical spatial data structure which subdivides space into buckets of grid shape (e.g., a square). Geohashes offer properties like arbitrary precision and the possibility of gradually removing characters from the end of the code to reduce its size (and gradually lose precision). As a consequence of the gradual precision degradation, nearby places will often (but not always) present similar prefixes. The longer a shared prefix is, the closer the two places are. geo cells can be used as a unique identifier and to approximate point data (e.g., in databases).

In one aspect, a "geohash" is used to refer to a string encoding of an area or point on the Earth. The area or point on the Earth may be represented (among other possible coordinate systems) as a latitude/longitude or Easting/Northing—the choice of which is dependent on the coordinate system chosen to represent an area or point on the Earth. geo cell can refer to an encoding of this area or point, where the geo cell may be a binary string comprised of 0s and 1s corresponding to the area or point, or a string comprised of 0s, 1s, and a ternary character (such as X)—which is used to refer to a don't care character (0 or 1). A geo cell can also be represented as a string encoding of the area or point, for example, one possible encoding is base-32, where every 5 binary characters are encoded as an ASCII character.

Depending on latitude, the size of an area defined at a specified geo cell precision can vary. When geohash is used for spatial indexing, the areas defined at various geo cell precisions are approximately:

TABLE 1

Example Areas at Various Geo Cell Precisions

| geo cell Length/Precision | width × height |
|---|---|
| 1 | 5,009.4 km × 4,992.6 km |
| 2 | 1,252.3 km × 624.1 km |
| 3 | 156.5 km × 156 km |
| 4 | 39.1 km × 19.5 km |
| 5 | 4.9 km × 4.9 km |
| 6 | 1.2 km × 609.4 m |
| 7 | 152.9 m × 152.4 m |
| 8 | 38.2 m × 19 m |
| 9 | 4.8 m × 4.8 m |
| 10 | 1.2 m × 59.5 cm |
| 11 | 14.9 cm × 14.9 cm |
| 12 | 3.7 cm × 1.9 cm |

Other geo cell geometries, such as, hexagonal tiling, triangular tiling, etc. are also possible. For example, the H3 geospatial indexing system is a multi-precision hexagonal tiling of a sphere (such as the Earth) indexed with hierarchical linear indexes.

In another aspect, geo cells are a hierarchical decomposition of a sphere (such as the Earth) into representations of regions or points based a Hilbert curve (e.g., the S2 hierarchy or other hierarchies). Regions/points of the sphere can be projected into a cube and each face of the cube includes a quad-tree where the sphere point is projected into. After that, transformations can be applied and the space discretized. The geo cells are then enumerated on a Hilbert Curve (a space-filling curve that converts multiple dimensions into one dimension and preserves the approximate locality).

Due to the hierarchical nature of geo cells, any signal, event, entity, etc., associated with a geo cell of a specified precision is by default associated with any less precise geo cells that contain the geo cell. For example, if a signal is associated with a geo cell of precision 9, the signal is by default also associated with corresponding geo cells of precisions 1, 2, 3, 4, 5, 6, 7, and 8. Similar mechanisms are applicable to other tiling and geo cell arrangements. For example, S2 has a cell level hierarchy ranging from level zero (85,011,012 km$^2$) to level 30 (between 0.48 cm$^2$ to 0.96 cm$^2$).

Signal Ingestion and Normalization

Signal ingestion modules ingest a variety of raw structured and/or raw unstructured signals on an on going basis and in essentially real-time. Raw signals can include social posts, live broadcasts, traffic camera feeds, other camera feeds (e.g., from other public cameras or from CCTV cameras), listening device feeds, 911 calls, weather data, planned events, IoT device data, crowd sourced traffic and road information, satellite data, air quality sensor data, smart city sensor data, public radio communication (e.g., among first responders and/or dispatchers, between air traffic controllers and pilots), etc. The content of raw signals can include images, video, audio, text, etc.

In general, signal normalization can prepare (or preprocess) raw signals into normalized signals to increase efficiency and effectiveness of subsequent computing activities, such as, event detection, event notification, etc., that utilize the normalized signals. For example, signal ingestion modules can normalize raw signals into normalized signals having a Time, Location, and Context (TLC) dimensions. An event detection infrastructure can use the Time, Location, and Content dimensions to more efficiently and effectively detect events.

Per signal type and signal content, different normalization modules can be used to extract, derive, infer, etc. Time, Location, and Context dimensions from/for a raw signal. For example, one set of normalization modules can be configured to extract/derive/infer Time, Location and Context dimensions from/for social signals. Another set of normalization modules can be configured to extract/derive/infer Time, Location and Context dimensions from/for Web signals. A further set of normalization modules can be configured to extract/derive/infer Time, Location and Context dimensions from/for streaming signals.

Normalization modules for extracting/deriving/inferring Time, Location, and Context dimensions can include text processing modules, NLP modules, image processing modules, video processing modules, etc. The modules can be used to extract/derive/infer data representative of Time, Location, and Context dimensions for a signal. Time, Location, and Context dimensions for a signal can be extracted/derived/inferred from metadata and/or content of the signal.

For example, NLP modules can analyze metadata and content of a sound clip to identify a time, location, and keywords (e.g., fire, shooter, etc.). An acoustic listener can also interpret the meaning of sounds in a sound clip (e.g., a gunshot, vehicle collision, etc.) and convert to relevant context. Live acoustic listeners can determine the distance and direction of a sound. Similarly, image processing modules can analyze metadata and pixels in an image to identify a time, location and keywords (e.g., fire, shooter, etc.). Image processing modules can also interpret the meaning of parts of an image (e.g., a person holding a gun, flames, a store logo, etc.) and convert to relevant context. Other modules can perform similar operations for other types of content including text and video.

Per signal type, each set of normalization modules can differ but may include at least some similar modules or may share some common modules. For example, similar (or the same) image analysis modules can be used to extract named entities from social signal images and public camera feeds. Likewise, similar (or the same) NLP modules can be used to extract named entities from social signal text and web text.

In some aspects, an ingested signal includes sufficient expressly defined time, location, and context information upon ingestion. The expressly defined time, location, and context information is used to determine Time, Location, and Context dimensions for the ingested signal. In other aspects, an ingested signal lacks expressly defined location information or expressly defined location information is insufficient (e.g., lacks precision) upon ingestion. In these other aspects, Location dimension or additional Location dimension can be inferred from features of an ingested signal and/or through references to other data sources. In further aspects, an ingested signal lacks expressly defined context information or expressly defined context information is insufficient (e.g., lacks precision) upon ingestion. In these further aspects, Context dimension or additional Context dimension can be inferred from features of an ingested signal and/or through reference to other data sources.

In further aspects, time information may not be included, or included time information may not be given with high enough precision and Time dimension is inferred. For example, a user may post an image to a social network which had been taken some indeterminate time earlier.

Normalization modules can use named entity recognition and reference to a geo cell database to infer Location dimension. Named entities can be recognized in text, images, video, audio, or sensor data. The recognized named entities can be compared to named entities in geo cell entries. Matches indicate possible signal origination in a geographic area defined by a geo cell.

As such, a normalized signal can include a Time dimension, a Location dimension, a Context dimension (e.g., single source probabilities and probability details), a signal type, a signal source, and content.

A single source probability can be calculated by single source classifiers (e.g., machine learning models, artificial intelligence, neural networks, statistical models, etc.) that consider hundreds, thousands, or even more signal features of a signal. Single source classifiers can be based on binary models and/or multi-class models.

FIG. 1A depicts part of computer architecture 100 that facilitates ingesting and normalizing signals. As depicted, computer architecture 100 includes signal ingestion modules 101, social signals 171, Web signals 172, and streaming signals 173. Signal ingestion modules 101, social signals 171, Web signals 172, and streaming signals 173 can be connected to (or be part of) a network, such as, for example, a system bus, a Local Area Network ("LAN"), a Wide Area Network ("WAN"), and even the Internet. Accordingly, signal ingestion modules 101, social signals 171, Web signals 172, and streaming signals 173 as well as any other connected computer systems and their components can create and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), Simple Object Access Protocol (SOAP), etc. or using other non-datagram protocols) over the network.

Signal ingestion module(s) 101 can ingest raw signals 121, including social signals 171, web signals 172, and streaming signals 173 (e.g., social posts, traffic camera feeds, other camera feeds, listening device feeds, 911 calls, weather data, planned events, IoT device data, crowd sourced traffic and road information, satellite data, air quality sensor data, smart city sensor data, public radio communication, etc.) on going basis and in essentially real-time. Signal ingestion module(s) 101 include social content ingestion modules 174, web content ingestion modules 175, stream content ingestion modules 176, and signal formatter 180. Signal formatter 180 further includes social signal processing module 181, web signal processing module 182, and stream signal processing modules 183.

For each type of signal, a corresponding ingestion module and signal processing module can interoperate to normalize the signal into a Time, Location, Context (TLC) dimensions. For example, social content ingestion modules 174 and social signal processing module 181 can interoperate to normalize social signals 171 into TLC dimensions. Similarly, web content ingestion modules 175 and web signal processing module 182 can interoperate to normalize web signals 172 into TLC dimensions. Likewise, stream content ingestion modules 176 and stream signal processing modules 183 can interoperate to normalize streaming signals 173 into TLC dimensions.

In one aspect, signal content exceeding specified size requirements (e.g., audio or video) is cached upon ingestion. Signal ingestion modules 101 include a URL or other identifier to the cached content within the context for the signal.

In one aspect, signal formatter 180 includes modules for determining a single source probability as a ratio of signals turning into events based on the following signal properties: (1) event class (e.g., fire, accident, weather, etc.), (2) media type (e.g., text, image, audio, etc.), (3) source (e.g., twitter, traffic camera, first responder radio traffic, etc.), and (4) geo type (e.g., geo cell, region, or non-geo). Probabilities can be stored in a lookup table for different combinations of the signal properties. Features of a signal can be derived and used to query the lookup table. For example, the lookup table can be queried with terms ("accident", "image", "twitter", "region"). The corresponding ratio (probability) can be returned from the table.

In another aspect, signal formatter 180 includes a plurality of single source classifiers (e.g., artificial intelligence, machine learning modules, neural networks, etc.). Each single source classifier can consider hundreds, thousands, or even more signal features of a signal. Signal features of a signal can be derived and submitted to a signal source classifier. The single source classifier can return a probability that a signal indicates a type of event. Single source classifiers can be binary classifiers or multi-source classifiers.

Raw classifier output can be adjusted to more accurately represent a probability that a signal is a "true positive". For example, 1,000 signals whose raw classifier output is 0.9 may include 80% as true positives. Thus, probability can be adjusted to 0.8 to reflect true probability of the signal being a true positive. "Calibration" can be done in such a way that for any "calibrated score" this score reflects the true probability of a true positive outcome.

Signal ingestion modules 101 can insert one or more single source probabilities and corresponding probability details into a normalized signal to represent a Context (C) dimension. Probability details can indicate a probabilistic model and features used to calculate the probability. In one aspect, a probabilistic model and signal features are contained in a hash field.

Signal ingestion modules 101 can access "transdimensionality" transformations structured and defined in a "TLC" dimensional model. Signal ingestion modules 101 can apply the "transdimensionality" transformations to generic source data in raw signals to re-encode the source data into normalized data having lower dimensionality. Dimensionality reduction can include reducing dimensionality of a raw signal to a normalized signal including a T vector, an L vector, and a C vector. At lower dimensionality, the complexity of measuring "distances" between dimensional vectors across different normalized signals is reduced.

Thus, in general, any received raw signals can be normalized into normalized signals including a Time (T) dimension, a Location (L) dimension, a Context (C) dimension, signal source, signal type, and content. Signal ingestion modules 101 can send normalized signals 122 to event detection infrastructure 103.

For example, signal ingestion modules 101 can send normalized signal 122A, including time 123A, location 124A, context 126A, content 127A, type 128A, and source 129A to event detection infrastructure 103. Similarly, signal ingestion modules 101 can send normalized signal 122B, including time 123B, location 124B, context 126B, content 127B, type 128B, and source 129B to event detection infrastructure 103.

Event Detection

Figure 1B:
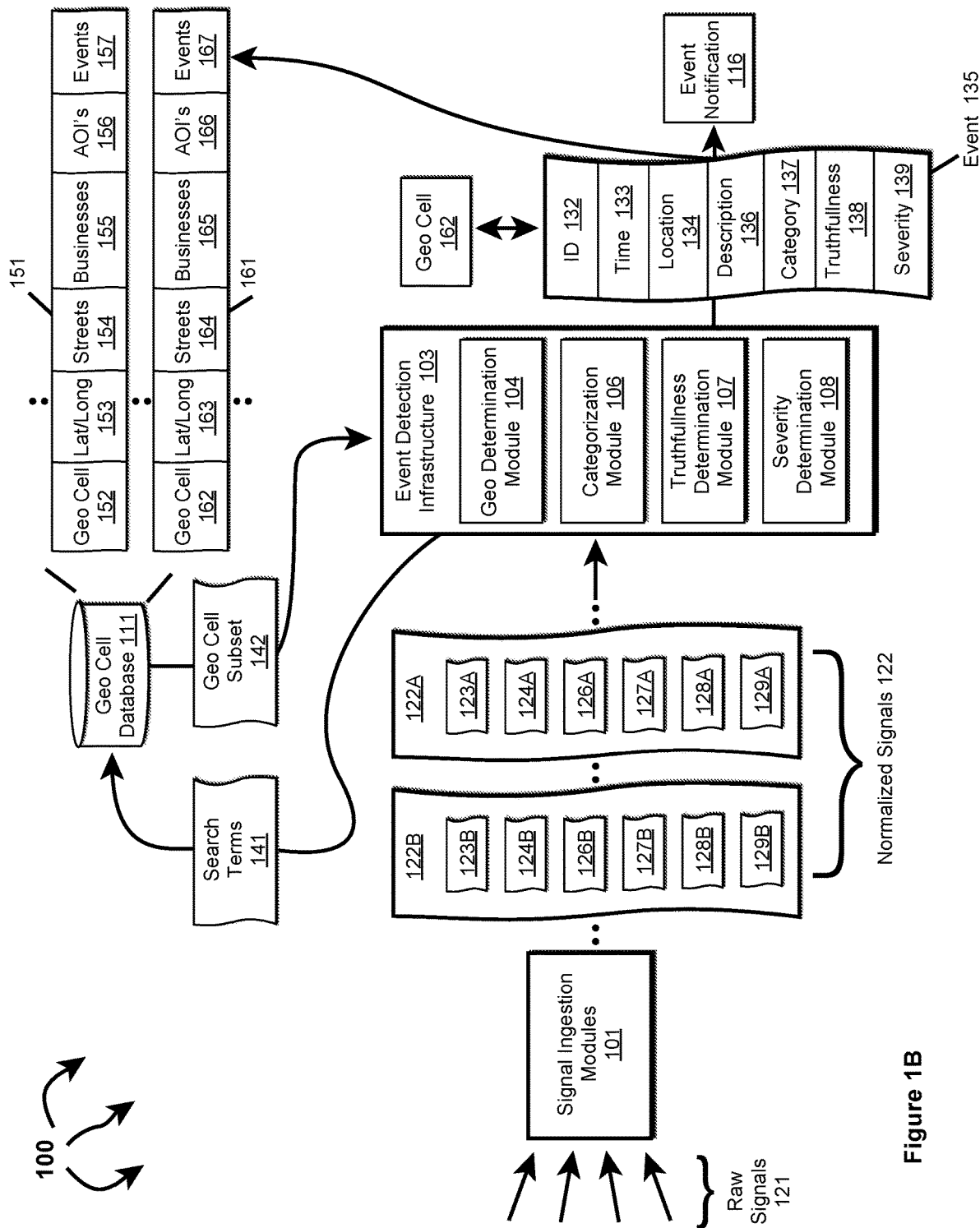
FIG. 1B illustrates an example computer architecture that facilitates detecting events from normalized signals.

FIG. 1B depicts part of computer architecture 100 that facilitates detecting events. As depicted, computer architecture 100 includes geo cell database 111 and even notification 116. Geo cell database 111 and event notification 116 can be connected to (or be part of) a network with signal ingestion modules 101 and event detection infrastructure 103. As such, geo cell database 111 and even notification 116 can create and exchange message related data over the network.

As described, in general, on an ongoing basis, concurrently with signal ingestion (and also essentially in real-time), event detection infrastructure 103 detects different categories of (planned and unplanned) events (e.g., fire, police response, mass shooting, traffic accident, natural disaster, storm, active shooter, concerts, protests, etc.) in different locations (e.g., anywhere across a geographic area, such as, the United States, a State, a defined area, an impacted area, an area defined by a geo cell, an address, etc.), at different times from Time, Location, and Context dimensions included in normalized signals. Since, normalized signals are normalized to include Time, Location, and Context dimensions, event detection infrastructure 103 can handle normalized signals in a more uniform manner increasing event detection efficiency and effectiveness.

Event detection infrastructure 103 can also determine an event truthfulness, event severity, and an associated geo cell. In one aspect, a Context dimension in a normalized signal increases the efficiency and effectiveness of determining truthfulness, severity, and an associated geo cell.

Generally, an event truthfulness indicates how likely a detected event is actually an event (vs. a hoax, fake, misinterpreted, etc.). Truthfulness can range from less likely to be true to more likely to be true. In one aspect, truthfulness is represented as a numerical value, such as, for example, from 1 (less truthful) to 10 (more truthful) or as percentage value in a percentage range, such as, for example, from 0% (less truthful) to 100% (more truthful). Other truthfulness representations are also possible. For example, truthfulness can be a dimension or represented by one or more vectors.

Generally, an event severity indicates how severe an event is (e.g., what degree of badness, what degree of damage, etc. is associated with the event). Severity can range from less severe (e.g., a single vehicle accident without injuries) to more severe (e.g., multi vehicle accident with multiple injuries and a possible fatality). As another example, a shooting event can also range from less severe (e.g., one victim without life threatening injuries) to more severe (e.g., multiple injuries and multiple fatalities). In one aspect, severity is represented as a numerical value, such as, for example, from 1 (less severe) to 5 (more severe). Other severity representations are also possible. For example, severity can be a dimension or represented by one or more vectors.

In general, event detection infrastructure 103 can include a geo determination module including modules for processing different kinds of content including location, time, context, text, images, audio, and video into search terms. The geo determination module can query a geo cell database with search terms formulated from normalized signal content. The geo cell database can return any geo cells having matching supplemental information. For example, if a search term includes a street name, a subset of one or more geo cells including the street name in supplemental information can be returned to the event detection infrastructure.

Event detection infrastructure 103 can use the subset of geo cells to determine a geo cell associated with an event location. Events associated with a geo cell can be stored back into an entry for the geo cell in the geo cell database. Thus, over time an historical progression of events within a geo cell can be accumulated.

As such, event detection infrastructure 103 can assign an event ID, an event time, an event location, an event category, an event description, an event truthfulness, and an event severity to each detected event. Detected events can be sent to relevant entities, including to mobile devices, to computer systems, to APIs, to data storage, etc.

Event detection infrastructure 103 detects events from information contained in normalized signals 122. Event detection infrastructure 103 can detect an event from a single normalized signal 122 or from multiple normalized signals 122. In one aspect, event detection infrastructure 103 detects an event based on information contained in one or more normalized signals 122. In another aspect, event detection infrastructure 103 detects a possible event based on information contained in one or more normalized signals 122. Event detection infrastructure 103 then validates the potential event as an event based on information contained in one or more other normalized signals 122.

As depicted, event detection infrastructure 103 includes geo determination module 104, categorization module 106, truthfulness determination module 107, and severity determination module 108.

Geo determination module 104 can include NLP modules, image analysis modules, etc. for identifying location information from a normalized signal. Geo determination module 104 can formulate (e.g., location) search terms 141 by using NLP modules to process audio, using image analysis modules to process images, etc. Search terms can include street addresses, building names, landmark names, location names, school names, image fingerprints, etc. Event detection infrastructure 103 can use a URL or identifier to access cached content when appropriate.

Categorization module 106 can categorize a detected event into one of a plurality of different categories (e.g., fire, police response, mass shooting, traffic accident, natural disaster, storm, active shooter, concerts, protests, etc.) based on the content of normalized signals used to detect and/or otherwise related to an event.

Truthfulness determination module 107 can determine the truthfulness of a detected event based on one or more of: source, type, age, and content of normalized signals used to detect and/or otherwise related to the event. Some signal types may be inherently more reliable than other signal types. For example, video from a live traffic camera feed may be more reliable than text in a social media post. Some signal sources may be inherently more reliable than others. For example, a social media account of a government agency may be more reliable than a social media account of an individual. The reliability of a signal can decay over time.

Severity determination module 108 can determine the severity of a detected event based on or more of: location, content (e.g., dispatch codes, keywords, etc.), and volume of normalized signals used to detect and/or otherwise related to an event. Events at some locations may be inherently more severe than events at other locations. For example, an event at a hospital is potentially more severe than the same event at an abandoned warehouse. Event category can also be considered when determining severity. For example, an event categorized as a "Shooting" may be inherently more severe than an event categorized as "Police Presence" since a shooting implies that someone has been injured.

Geo cell database 111 includes a plurality of geo cell entries. Each geo cell entry is included in a geo cell defining an area and corresponding supplemental information about things included in the defined area. The corresponding supplemental information can include latitude/longitude, street names in the area defined by and/or beyond the geo cell, businesses in the area defined by the geo cell, other Areas of Interest (AOIs) (e.g., event venues, such as, arenas, stadiums, theaters, concert halls, etc.) in the area defined by the geo cell, image fingerprints derived from images captured in the area defined by the geo cell, and prior events that have occurred in the area defined by the geo cell. For example, geo cell entry 151 includes geo cell 152, lat/lon 153, streets 154, businesses 155, AOIs 156, and prior events 157. Each event in prior events 157 can include a location (e.g., a street address), a time (event occurrence time), an event category, an event truthfulness, an event severity, and an event description. Similarly, geo cell entry 161 includes geo cell 162, lat/lon 163, streets 164, businesses 165, AOIs 166, and prior events 167. Each event in prior events 167 can include a location (e.g., a street address), a time (event occurrence time), an event category, an event truthfulness, an event severity, and an event description.

Other geo cell entries can include the same or different (more or less) supplemental information, for example, depending on infrastructure density in an area. For example, a geo cell entry for an urban area can contain more diverse supplemental information than a geo cell entry for an agricultural area (e.g., in an empty field).

Geo cell database 111 can store geo cell entries in a hierarchical arrangement based on geo cell precision. As such, geo cell information of more precise geo cells is included in the geo cell information for any less precise geo cells that include the more precise geo cell.

Geo determination module 104 can query geo cell database 111 with search terms 141. Geo cell database 111 can identify any geo cells having supplemental information that matches search terms 141. For example, if search terms 141 include a street address and a business name, geo cell database 111 can identify geo cells having the street name and business name in the area defined by the geo cell. Geo cell database 111 can return any identified geo cells to geo determination module 104 in geo cell subset 142.

Geo determination module can use geo cell subset 142 to determine the location of event 135 and/or a geo cell associated with event 135. As depicted, event 135 includes event ID 132, time 133, location 137, description 136, category 137, truthfulness 138, and severity 139.

Event detection infrastructure 103 can also determine that event 135 occurred in an area defined by geo cell 162 (e.g., a geohash having precision of level 7 or level 9). For example, event detection infrastructure 103 can determine that location 134 is in the area defined by geo cell 162. As such, event detection infrastructure 103 can store event 135 in events 167 (i.e., historical events that have occurred in the area defined by geo cell 162).

Event detection infrastructure 103 can also send event 135 to event notification module 116. Event notification module 116 can notify one or more entities about event 135.

Figure 2:
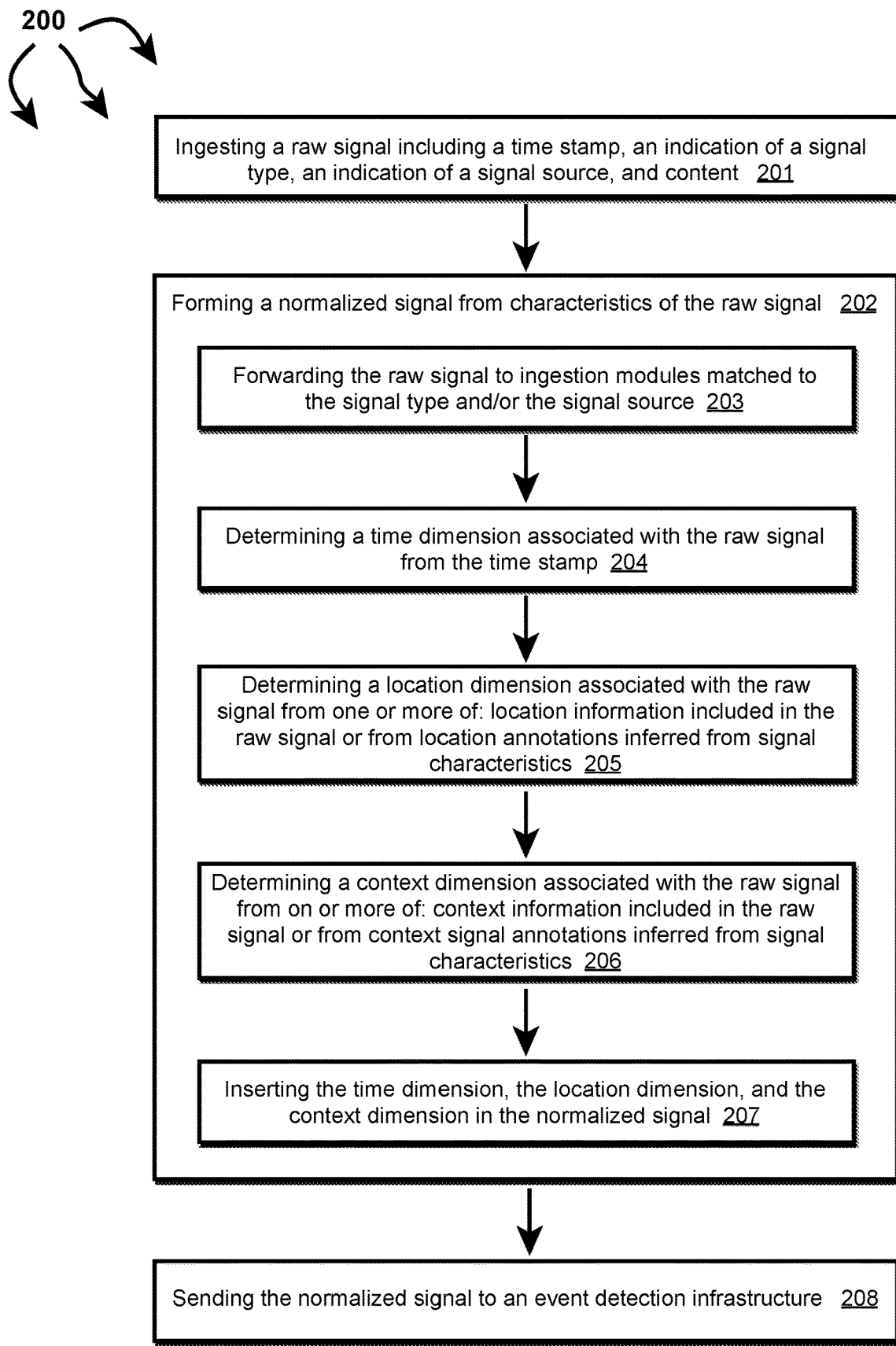
FIG. 2 illustrates a flow chart of an example method for normalizing ingested signals.

FIG. 2 illustrates a flow chart of an example method 200 for normalizing ingested signals. Method 200 will be described with respect to the components and data in computer architecture 100.

Method 200 includes ingesting a raw signal including a time stamp, an indication of a signal type, an indication of a signal source, and content (201). For example, signal ingestion modules 101 can ingest a raw signal 121 from one of: social signals 171, web signals 172, or streaming signals 173.

Method 200 includes forming a normalized signal from characteristics of the raw signal (202). For example, signal ingestion modules 101 can form a normalized signal 122A from the ingested raw signal 121.

Forming a normalized signal includes forwarding the raw signal to ingestion modules matched to the signal type and/or the signal source (203). For example, if ingested raw signal 121 is from social signals 171, raw signal 121 can be forwarded to social content ingestion modules 174 and social signal processing modules 181. If ingested raw signal 121 is from web signals 172, raw signal 121 can be forwarded to web content ingestion modules 175 and web signal processing modules 182. If ingested raw signal 121 is from streaming signals 173, raw signal 121 can be forwarded to stream content ingestion modules 176 and streaming signal processing modules 183.

Forming a normalized signal includes determining a time dimension associated with the raw signal from the time stamp (204). For example, signal ingestion modules 101 can determine time 123A from a time stamp in ingested raw signal 121.

Forming a normalized signal includes determining a location dimension associated with the raw signal from one or more of: location information included in the raw signal or from location annotations inferred from signal characteristics (205). For example, signal ingestion modules 101 can determine location 124A from location information included in raw signal 121 or from location annotations derived from characteristics of raw signal 121 (e.g., signal source, signal type, signal content).

Forming a normalized signal includes determining a context dimension associated with the raw signal from one or more of: context information included in the raw signal or from context signal annotations inferred from signal characteristics (206). For example, signal ingestion modules 101 can determine context 126A from context information included in raw signal 121 or from context annotations derived from characteristics of raw signal 121 (e.g., signal source, signal type, signal content).

Forming a normalized signal includes inserting the time dimension, the location dimension, and the context dimension in the normalized signal (207). For example, signal ingestion modules 101 can insert time 123A, location 124A, and context 126A in normalized signal 122. Method 200 includes sending the normalized signal to an event detection infrastructure (208). For example, signal ingestion modules 101 can send normalized signal 122A to event detection infrastructure 103.

Communication Channel Event Detection System

A system for detecting events from communication channels can include one or more communication channels and one or more analysis modules. A communication channel can carry one or more (e.g., streaming) communication signals, such as, streaming audio signals. Events can be detected from characteristics of communication signals ingested from the one or more communication channels.

Each communication channel can pre-associated with a geographic region or jurisdiction, such as, a municipality, county, city block, district, city, state, or other geographic region, but can alternatively be associated with a plurality of geographic regions. The geographic region for a communication channel can be received from a user, but can alternatively be automatically learned (e.g., based on the locations extracted from a communication signal) or otherwise determined. A communication channel can be an audio chancel, a video channel, or any other suitable channel. A communication channel can be a radio channel (e.g., a predetermined set of radio frequencies), optical channel (e.g., a predetermined set of light frequencies), or any other suitable channel. Examples of communication channels include: wireline and wireless telephone networks, computer networks broadcast and cable television, radio, Public Safety Land Mobile Radio, satellite systems, the Internet, Public Safety Answer Points (PSAPs) networks, Voice over Internet Protocol (VoIP) networks, or any other suitable channel. A communication channel can be public or private (e.g., wherein the login information can be stored, tokenized, or otherwise processed). Communication channels can be emergency communications (e.g., police, medical, coast guard, snow rescue, fire rescue, etc.), fleet communications (e.g., for a ridesharing fleet, a trucking fleet, etc.), or any other suitable set of communications.

A communication signal can encode content or other information. A communication signal can be an audio signal, video signal, or any other suitable signal. A communication signal can be digital (e.g., VOIP), analog, or have any other suitable format. A communication signal can be associated with signal parameters (e.g., audio parameters), such as amplitude (e.g., volume), frequency, patterns, or any other suitable parameters. A communication signal can be generated by an operator (e.g., dispatcher), in-field personnel (e.g., emergency personnel, firefighters, fleet operators, police, etc.), automatically generated, or generated by any other suitable entity. The entities can be associated with schedules (e.g., shifts), voice fingerprints, identifiers (e.g., names, codes, etc.), communication channels, modules (e.g., syntax modules), geographic regions (e.g., city blocks, municipalities, etc.), or any other suitable information. The entity information can be received (e.g., from a managing entity, such as a manager), automatically learned (e.g., historic patterns extracted from historic communication signals for the communication channel), or otherwise determined.

The one or more analysis modules can analyze communication signals or subsets thereof (e.g., communication clips, communication sub-clips, etc.). For example, a first module can select communication clips from the communication signal, a second module can identify a sub-clip for event probability analysis, a third module can determine the event probability from the sub-clip, a fourth module can determine a clip score for the communication clip (e.g., based on the sub-clip, surrounding signals, signal parameters, etc.), a fifth module can extract event parameters from the communication clip, and a sixth module can determine an event score based on the extracted event parameters. However, the system can include any suitable number of modules, arranged in any suitable configuration. The analysis modules can be included in, integrated with, and/or interoperate with signal ingestion modules 101 (e.g., stream content ingestion modules 176 and stream processing modules 183) and/or event detection infrastructure 103.

Analysis modules can be specific to a communication channel, a subset of communication channels (e.g., sharing a common parameter, such as location, state, time, etc.), an analysis stage, a set of analysis stages, be global, or be otherwise related to analysis processes and/or communication channels. For example, a clip determination module can be used for communication signals from any communication channel (e.g., wherein the signals can be fed into the same clip determination module, or the same clip determination module is replicated for each communication channel) with channel-specific modules used for remaining processes. However, analysis modules can be shared across channels for any suitable process. Analysis modules can be constant over time (e.g., used in multiple contexts), or can be dynamically selected based on time of day, event type (e.g., selected based on the event identifier extracted from the communication clip), the entities generating the communication signal, or based on any other suitable contextual parameter.

One or analysis more modules with the same communication channel and/or analysis process can operate concurrently. For example, multiple analysis modules can be concurrently executed to minimize module overfitting, and/or to concurrently test multiple versions of the same module (e.g., wherein the best module, such as the module that generates the least number of false positives or negatives, is subsequently selected for general use or subsequent training). The multiple modules can process the same clips, different clips, or any suitable set of clips. In another example, multiple modules are serially tested (e.g., on serial clips, the same clips, etc.). However, any suitable number of module variants can be used.

Each analysis module can implement any one or more of: a rule-based system (e.g., heuristic system), fuzzy logic (e.g., fuzzy matching), regression systems (e.g., ordinary least squares, logistic regression, stepwise regression, multivariate adaptive regression splines, locally estimated scatterplot smoothing, etc.), genetic programs, support vectors, an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm. Each module can additionally or alternatively include: probabilistic properties, heuristic properties, deterministic properties, and/or any other suitable properties. However, analysis modules can leverage any suitable computation method, machine learning method, and/or combination thereof.

Each analysis module can be generated, trained, updated, or otherwise adjusted using one or more of: manual generation (e.g., received from a user), supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style.

Each analysis module can be validated, verified, reinforced, calibrated, or otherwise updated based on newly received, up-to-date signals; historic signals (e.g., labeled or unlabeled); or be updated based on any other suitable data. Each module can be run or updated: in response to a number of false positives and/or false negatives exceeding a threshold value, determination of an actual result differing from an expected result, or at any other suitable frequency.

Detecting Events from Communication Signals

Aspects of the invention include using the described system to detect events from (e.g., streaming) communication signals, including streaming audio signals. Events can be detected concurrently as new communication signals are received, at a predetermined frequency, sporadically, in response to a trigger condition being met, or at any other suitable time.

Figure 3:
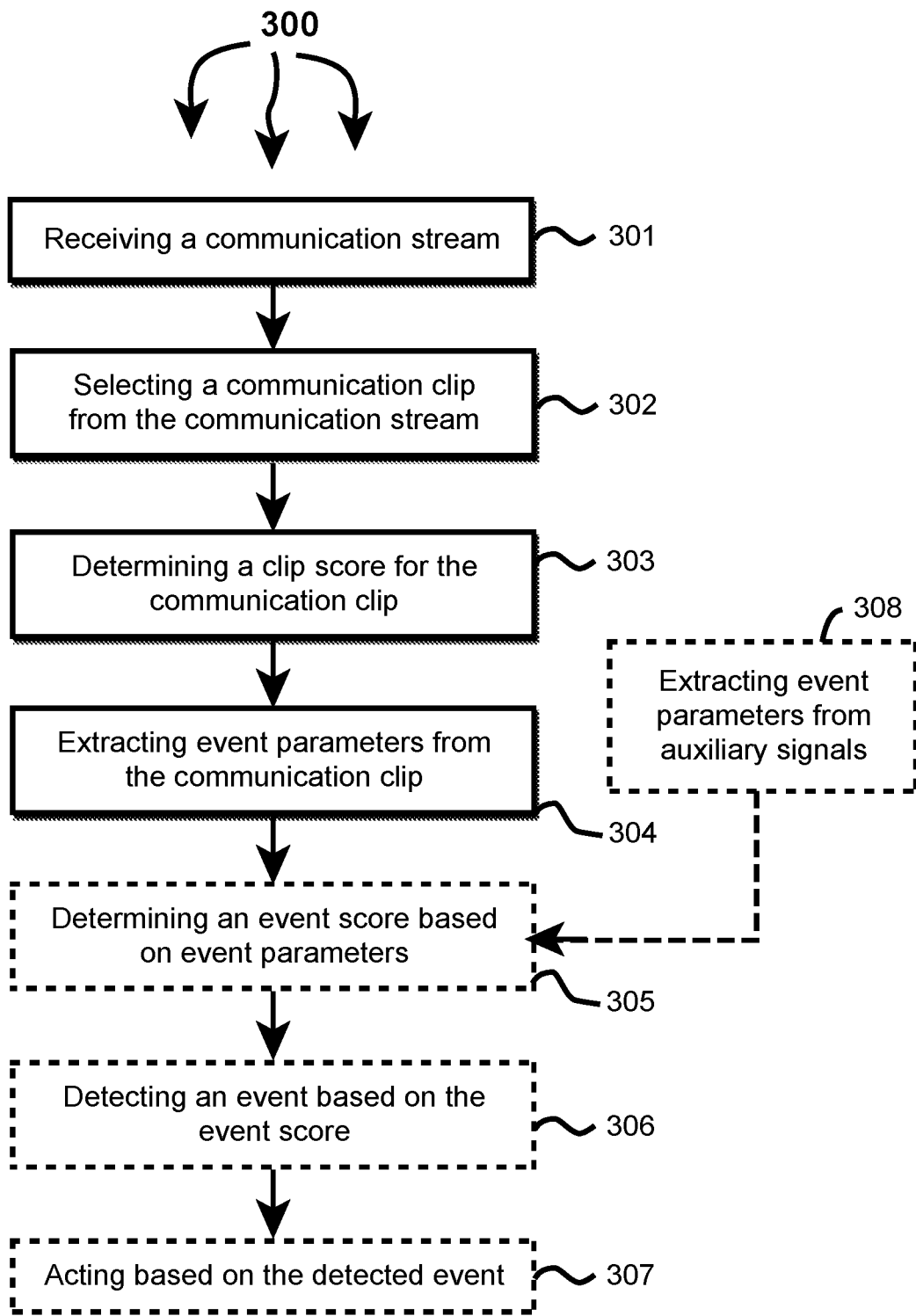
FIG. 3 illustrates a flow chart of an example method for ingesting a communication stream and detecting an event.

FIG. 3 illustrates a flow chart of an example method 300 for ingesting a communication stream and detecting an event. Method 300 includes receiving a communication stream (301). For example, a communication stream can be received from an audio channel, a video channel, or any other suitable channel. The communication stream can be received by a remote computing system (e.g., server system), a user device or any other suitable device. The communication stream can be generated by an entity, automatically generated (e.g., by a burglar alarm system), or be otherwise generated. A plurality of communication streams can be received concurrently from one or more communication channels or can be received at different times (e.g., in response to occurrence of a receipt condition being met, such as the signal amplitude exceeding a threshold value for a threshold period of time, etc.).

Method 300 includes selecting a communication clip from the communication stream (302). For example, a communication clip can be an audio clip, a video clip, or any other suitable clip. A communication clip can be a time-bounded segment of the received communication stream (e.g., substantially continuous segment, etc.), but can be otherwise defined. The communication clip can encompass a statement by a single entity, a conversation between two or more entities, or include any other suitable set of communications. One or more communication clips can be identified from a communication stream. The communication clip can be associated with a beginning timestamp, an end timestamp, a duration, one or more entities (e.g., generating the content in the clip), location (e.g., geographic region associated with the communication channel, geographic sub-region identified from the communication content, etc.), event, and/or any other suitable parameter.

As such, identifying the communication clip can include determining a clip beginning timestamp, determining a clip end timestamp, and storing a communication segment between the beginning and end timestamps. The beginning and end timestamps can be determined by a beginning module and end module, respectively. The beginning and end modules can be shared across a plurality of communication channels (e.g., be global modules) or can be specific to a given communication channel. The communication stream can be pre-processed to remove noise or other undesired acoustic features prior to communication clip identification, or can be the raw communication stream, a compressed communication stream, a normalized communication stream, or any other suitable version of the communication stream.

Determining a clip beginning timestamp can include detecting a beginning condition in the communication stream (e.g., received from a user, triggered by a sensor measurement, etc.). The beginning condition can include: the signal amplitude exceeding a threshold amplitude for a threshold period of time (e.g., a sustained increased volume on the channel; wherein the signal can be cached for at least the threshold period of time to enable beginning condition detection), the signal amplitude change exceeding a threshold change (e.g., a sudden increase in volume on the channel), the signal frequency patterns substantially matching a predetermined pattern (e.g., a characteristic beep or keyword precedes every transmission, wherein the pattern is associated with the beep or keyword), or be any other suitable condition.

Determining a clip end timestamp can include detecting an ending condition in the communication stream (e.g., received from a user, triggered by a sensor measurement, etc.). The ending condition can include: a satisfaction of a time condition after the beginning condition was detected (e.g., 30 seconds after the beginning condition, 1 minute after the beginning condition, etc.); the signal amplitude or difference falling below a threshold amplitude for a threshold period of time (e.g., wherein the last speech timestamp before the delay is set as the end timestamp); the signal frequency patterns substantially matching a predetermined pattern (e.g., a characteristic beep or keyword marks the end of every transmission, wherein the pattern is associated with the beep or keyword), or be any other suitable condition.

Identifying the communication clip can include stitching multiple audio clips together into a conversation (e.g., between dispatcher and emergency personnel). Stitching can be performed after a highly scored clip is detected, after a beginning condition is detected, or at any suitable time. In one variation, stitching includes: identifying a first voice and keyword within a first communication clip, identifying a second voice and the same or related keyword within a second communication clip, identifying subsequent audio clips including the first and second voices until a conversation end condition is met (e.g., end keyword is detected, the first or second voice has not been detected for a threshold period of time, etc.), and stitching the identified clips together into a conversation clip, wherein the conversation clip can be subsequently analyzed as the communication clip. However, the conversation can be otherwise aggregated.

Storing a communication segment between a beginning and end timestamps can include caching the communication stream after the beginning timestamp (e.g., timestamp of the stream segment from which the beginning condition was detected) until the end timestamp is determined (e.g., until the end condition is met), wherein segments of the communication stream outside of the beginning and end timestamps are not stored and/or deleted immediately. Alternatively, storing the communication segment can include storing the entire communication stream, post-processing the communication stream to extract communication segments, and optionally deleting the source communication stream. However, the communication segment can be otherwise stored.

Method 300 includes determining a clip score for the communication clip (303). For example, a clip score can be computed for a stored (cached) communication segment. Based on a clip score, it can be determined if further processing is worthwhile (e.g., how likely a clip is to include event information). Thus, a clip score can be indicative of whether a communication clip includes event information, more preferably whether the communication clip includes information for an event of interest, but can be associated with any other suitable parameter. An event of interest can be an event that occurs with less than a threshold frequency within a geographic region, be an event having a classification or type falling within a predetermined list (e.g., automatically generated, received from a managing entity, etc.), be an event with an event score exceeding a threshold score, or be otherwise defined.

A clip score can be: a score, a classification, a probability, a fitness, or be any other suitable metric. The clip score can be determined by a clip score module, such as a heuristic, probabilistic, or Bayesian module, a neural network, a genetic program, or other suitable module leveraging any other suitable analysis process. A clip score module can be specific to a communication channel (and/or entity generating the communication signal, such as a dispatcher) or can be global.

In one aspect, determining a clip score includes (a) identifying a sub-clip within the communication clip with the highest probability of having an event identifier, (b) analyzing the sub-clip for an event identifier, and (c) determining the clip score based on event identifier. The event identifier can be a keyword (e.g., "fire," "shot," other descriptor, etc.), a code (e.g., "211" for robbery, "242" for battery, "187" for homicide, etc.), or be any other suitable identifier.

A sub-clip can be identified by a module specific to a communication channel or geographic region associated with the communication channel. A sub-clip can be identified (e.g., extracted) based on a predetermined syntax or pattern associated with the communication channel or geographic region randomly selected, determined by pattern-matching the signal parameters (e.g., amplitude patterns, frequency patterns, etc.), or otherwise identified. A predetermined syntax can include an event identifier position within the communication clip and can include other information arranged in a predetermined pattern or order.

For example, a predetermined syntax can include an event identifier, followed by an event severity, followed by an event location. In another example, a predetermined syntax can include an entity identifier, an event identifier, and an event description. In a further example, a predetermined syntax can include an event identifier's start and end timestamp within the communication clip (e.g., between 0 sec and 30 sec, between 10 sec and 30 sec into the clip). A predetermined syntax can be received from an entity associated with the communication channel or geographic region, learned (e.g., from historic communication clips from the communication channel), or otherwise determined.

Figure 6A:
FIGS. 6A and 6B are example syntaxes for a first and a second communication channel, respectively.
Figure 6B:
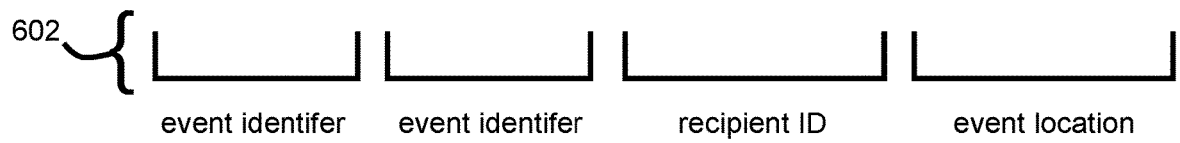

FIG. 6A depicts an example channel syntax 601 including an event identifier, followed by a recipient ID, followed by an event location, followed by event details. FIG. 6B depicts an example channel syntax 602 including an event identifier, followed by another event identifier, followed by a recipient ID, followed by an event location.

Analyzing a sub-clip for an event identifier can determine whether the clip includes an event identifier and/or which event identifier the clip includes. In a first variation, analyzing a sub-clip includes: performing natural language processing on the sub-clip to extract the event identifier. In a second variation, analyzing the sub-clip includes: identifying the author of the sub-clip (e.g., the speaker), retrieving signal patterns associated with the author, identifying a signal pattern (from the retrieved signal patterns) substantially matching the sub-clip, and associating the sub-clip with the event identifier associated with the identified signal pattern. The author of the sub-clip can be identified using: voice recognition, based on the time (e.g., according to a shift schedule), an entity code or name extracted from the communication clip, or otherwise determined.

Determining the clip score based on event identifier can indicate whether a communication clip is to be subsequently (further) processed to extract event parameters. In one variation, a clip is assigned a clip score associated with the event identifier (e.g., extracted from the sub-clip). In a second variation, a clip score is calculated from the event identifier, signal parameters (e.g., amplitude, frequency, etc.), keywords surrounding the sub-clip, and/or any other suitable parameter value.

In a second variation, a clip score is determined from feature values extracted from the communication clip. In one aspect, clips score determination includes: extracting keywords from the communication clip (e.g., event identifiers, etc.) and calculating the clip score based on values, weights, and/or other metrics associated with the extracted keywords. In a second aspect, clips score determination includes: identifying a location from the communication clip, identifying social networking system content authored within a predetermined time window of the communication clip timestamp, and calculating the clip score based on features extracted from the content.

In a third variation, a clip score is determined based on the signal parameter values. For example, a clip score can be calculated from the signal amplitude (e.g., mean, median, duration above a threshold value, etc.), the amplitude change, the frequency (e.g., mean, median, deviation, duration above a threshold value, etc.), the signal parameter value deviation from a baseline value for the geographic location, or from any other suitable signal parameter value or metric. In a fourth variation, a clip score is determined based on a signal pattern, wherein each of a predetermined set of signal patterns is associated with a clip score (e.g., determined from past verified events).

Method 300 includes extracting event parameters from the communication clip (304). Event parameters can include the event location, event time (e.g., start time, end time, duration), subject matter or context (e.g., fire, shooting, homicide, cat in tree, etc.), severity (e.g., 3 alarm fire, 2 alarm fire, gunfire v. murder), people, or any other suitable event parameter. Event parameters can be extracted from the communication clip in response to clip score exceeding threshold clip score or upon satisfaction of any other suitable condition. The event parameters can be extracted from the entirety of a communication clip, from sub-clips of the communication clip (e.g., the same or different sub-clip from that used to determine the event identifier), from auxiliary (other) signals identified based on the communication clip parameters (e.g., geographic region, time, volume of interactions between emergency personnel and operator, signal strength, signal parameters, etc.), channel parameters (e.g., geographic region, historic frequency of events detected from the channel), clip content (e.g., words, phrases, cadence, number of back-and-forth communications, etc.), or from any other suitable information. Event parameters can be extracted using modules specific to a communication channel (e.g., trained on historic labeled signals from the communication channel), or using global modules. Each event parameter can be extracted using a different module (e.g., one for event location, another for event time), but can alternatively be extracted using the same module or any other suitable set of modules.

In one variation, extracting event parameters includes determining the event location. The event location can be a geofence, specific location (e.g., latitude, longitude, etc.), address, specific location obfuscated to a predetermined radius, a geographic region identifier (e.g., municipality identifier, district identifier, city identifier, state identifier, etc.), or be any other suitable location identifier. The event location can be determined from the geographic region associated with the source communication channel, location identifiers extracted from the communication clip, the location of the in-field recipient (e.g., retrieved from the recipient's user device location, the recipient's social networking system posts, etc.), or determined from any other suitable information.

In one aspect, determining event location can include: identifying the initial geographic region associated with the source communication channel, extracting a geographic identifier (e.g., street names, address numbers, landmark names, etc.) from the clip, finding a known geographic identifier within the initial geographic region substantially matching the extracted geographic identifier (e.g., best match), and assigning the known geographic identifier as the event location. In another aspect, determining an event location includes: extracting the geographic identifier from the clip and searching a global set of known identifiers for a match. Extracting the geographic identifier can include: analyzing the entire communication clip for a geographic identifier (e.g., performing NLP on the entire clip); identifying a sub-clip with the highest probability of having the geographic identifier (e.g., using the syntax model, trained on historic audio clips with the geographic identifier portion tagged); identifying a signal pattern associated with a geographic identifier and performing NLP on the clip segment exhibiting the signal pattern; or otherwise extracting the geographic identifier.

In a second variation, extracting event parameters includes determining the event time. In a first example, event time can be the communication clip time. In second example, event time can be a time mentioned in the communication clip (e.g., specific time, relative time, such as "5 minutes ago"). The time can be extracted from a sub-clip with the highest probability of having the event time, or otherwise determined.

In a third variation, extracting event parameters includes determining the event subject matter or context. The subject matter or context can be determined from the event identifier or from the content surrounding the event identifier sub-clip (e.g., using NLP, pattern matching, etc.).

Extracted event parameters can be used to compute time dimension, location dimension, and context dimension for a (e.g., streaming) communication signal, such as, a streaming audio signal.

In a fourth variation, extracting event parameters includes determining an event severity. The event severity can be determined from the event identifier (e.g., the event code, the keyword, etc.), the voice register, the voice amplitude, the word frequency, the keyword frequency, the word choice, or from any other suitable parameter. The event severity can be a severity score, a classification, or be any other suitable descriptor. For example, the event severity can be higher when the voice register is higher than the historic register for the entity. However, the event severity can be otherwise determined.

Method 300 can include extracting event parameters from auxiliary (other) signals (308). For example, event parameters can be extracted from other signals received at signal ingestion modules 101. Other signals can include social signals, web signals, public cameras, social broadcasts, etc.

Method 300 includes determining an event score based on event parameters (305). An event score can be determined using an event identifier-specific module, a channel-specific module, a context-specific module, a global module, or using any other suitable module. An event score can be calculated, computed, selected, matched, classified, or otherwise determined. An event score can be determined based on: event parameters extracted from the communication clip, the historic event parameters for the event location (see FIG. 7), the historic event parameters for the neighboring geographic locations, the event parameters extracted from substantially concurrent communication signal(s) for neighboring geographic locations, auxiliary signals associated with the event location (e.g., posts from social networking systems, video, etc.), the number of detected clips (or other signals) associated with the event and/or event location, or from any other suitable information.

In one example, an event score is calculated as a function of the deviation between the extracted event parameter values and the historic event parameter values. In a second example, an event score is calculated from signal parameter values and an event identifier, wherein the event identifier is associated with a value and the signal parameters are associated with differing weights.

Figure 7:
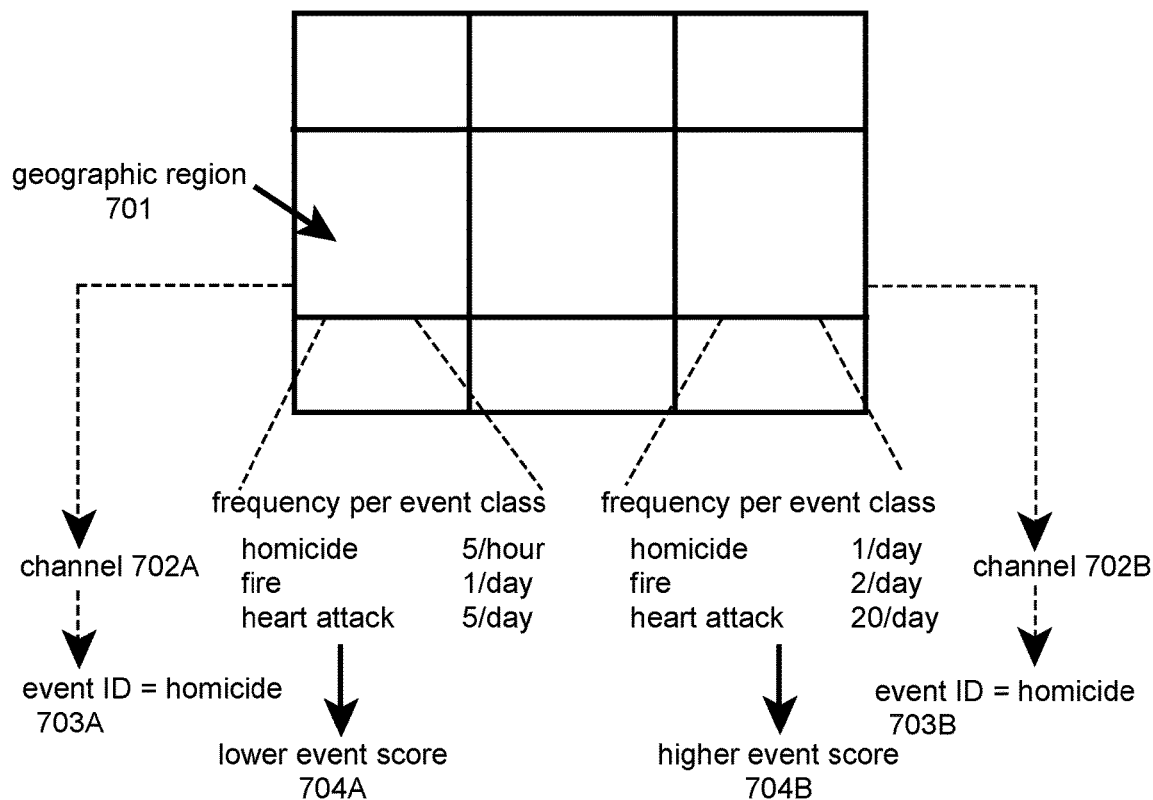
FIG. 7 is an example of event scoring based on historic parameter values for a geographic region.

FIG. 7 is an example of event scoring based on historic parameter values for a geographic region. As depicted, (e.g., streaming) communication signals are received via channels 702A and 702B within geographic region 701. For each channel 702A and 702B, a frequency per event class is depicted. For event IDs 703A and 703D indicating "homicide", lower event score 704A and higher event score 704B can be computed.

In one aspect, an event score is computed from parameters extracted from a (e.g., streaming) communication clip in combination with parameters extracted from auxiliary (other ingested) signals.

Method 300 includes detecting an event based on the event score (306). An event can be detected in response to an event score exceeding a threshold event score or upon satisfaction of any other suitable condition. A threshold event score can specific to an entity (e.g., financial entity, logistics entity, news entity, brand entity, protection services, etc.), can be global or can have any other suitable relevancy. A threshold event score can be automatically determined for geographic region (e.g., based on historic event scores for similar contexts, such as time; historic clip scores for neighbors; etc.), received from the entity, automatically selected based on entity parameters (e.g., the entity's classification, profile, type, interests, keywords, event interests, etc.), or otherwise determined.

An event can optionally be validated using auxiliary (other ingested) signals. For example, a low-scoring event can be considered an event of interest in response to the same event being detected in multiple auxiliary (other) signal sources (e.g., social networking systems, multiple emergency services, Web signals, etc.). Alternatively, the event score can be augmented or otherwise adjusted based on event scores extracted from the auxiliary (other ingested) signals.

Method 300 includes acting based on the detected event (307). For example, an action can be performed in response to event detection. In a first variation, a notification is sent to an entity in response to event detection. The notification can include event parameters (e.g., extracted from the communication clip, from auxiliary signals, etc.) or any other suitable information. In a second variation, delivery systems, vehicles, or other systems are automatically rerouted based on an event location, event type (e.g., extracted from the event identifier), event severity, and/or event time (e.g., to avoid the event). In a third variation, content (e.g., posts, images, videos, sensor signals, or other content) associated with the event location and generated proximal the event time from the communication channel, auxiliary (other) signals, or other sources is aggregated.

Event Score Generation Example

Figure 4:
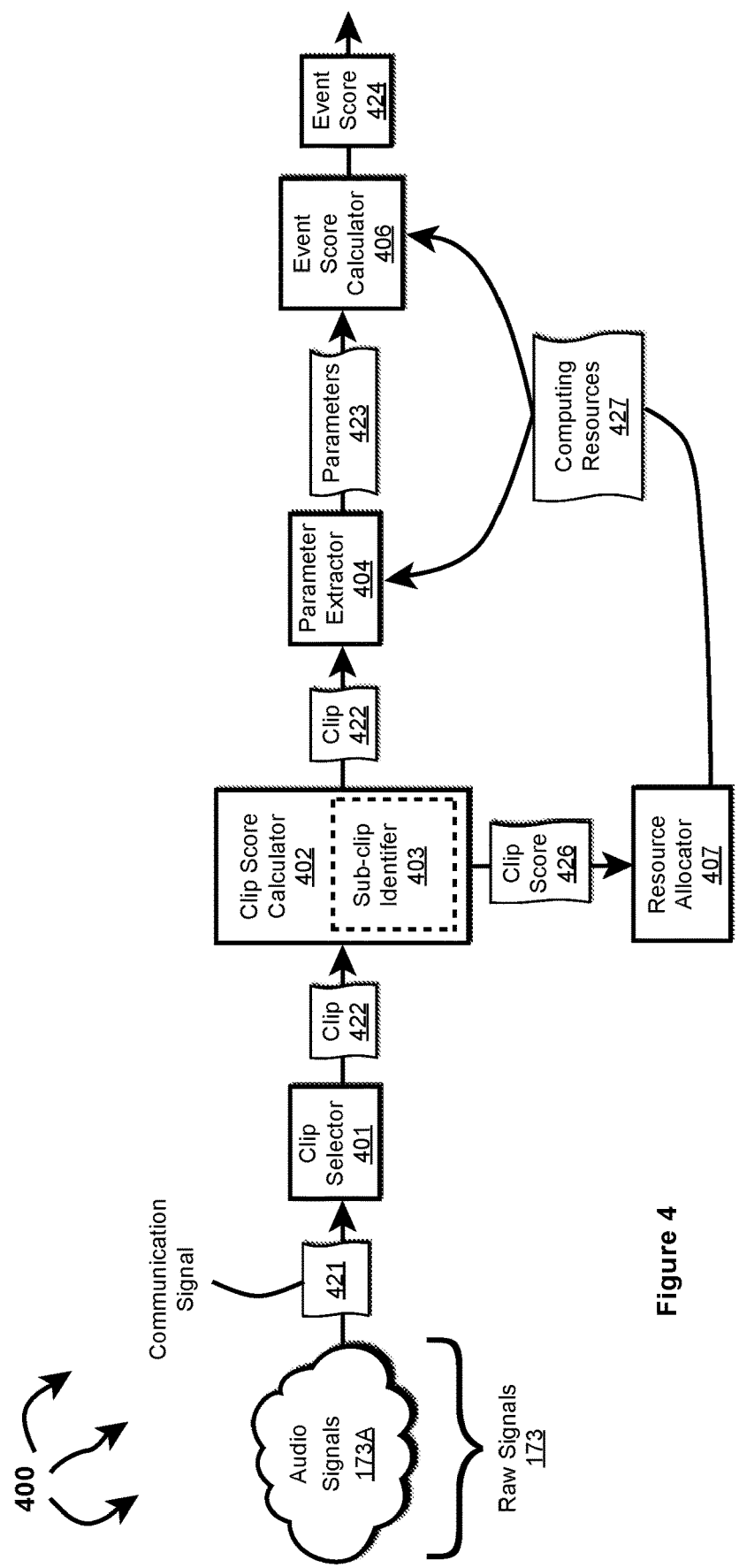
FIG. 4 illustrates an example computer architecture that facilitates generating event scores from ingested communication streams.

FIG. 4 illustrates an example computer architecture 400 that facilitates generating an event score from ingested communication streams. As depicted, computer architecture 400 includes clip selector 401, clip score calculator 402, parameter extractor 404, event score calculator 406, and resource allocator 407. Clip score calculator 402 further includes sub-clip identifier 403. Clip selector 401, clip score calculator 402, parameter extractor 404, event score calculator 406, and resource allocator 407 can be included in, integrated with, and/or interoperate with signal ingestion modules 101 (e.g., stream content ingestion modules 176 and stream processing modules 183) and/or event detection infrastructure 103.

In general, clip selector 401 is configured select a clip from a (e.g., streaming) communication (e.g., audio) signal using any of the described clip selection mechanisms. Clip score calculator 402 is configured to calculate a clip score for a selected clip using any of the described mechanisms. Sub-clip identifier 403 is configured to identify a sub-clip from within a selected clip using any of the described mechanisms. Parameter extractor 404 is configured to extract parameters from a selected clip using any of the described mechanisms. Event score calculator is configured to calculate an event score from extracted parameters using any of the described mechanisms.

Resource allocator 407 is configured to determine when additional resources are to be allocated to further process a selected clip. When additional resources are to be allocated, resource allocator allocates the additional resources to parameter extractor 404 and event score calculator. In one aspect, resource allocator determines when additional resources are to be allocated based on a clip score. When a clip score exceeds a threshold clip score, additional resources can be allocated. When a clip score does not exceed a threshold clip score, additional resources are not allocated. As such, additional resources can be allocated when there is increased likelihood of a (e.g., streaming) communication signal including event information. Otherwise, resources are conserved to allocate for other functions.

Figure 5:
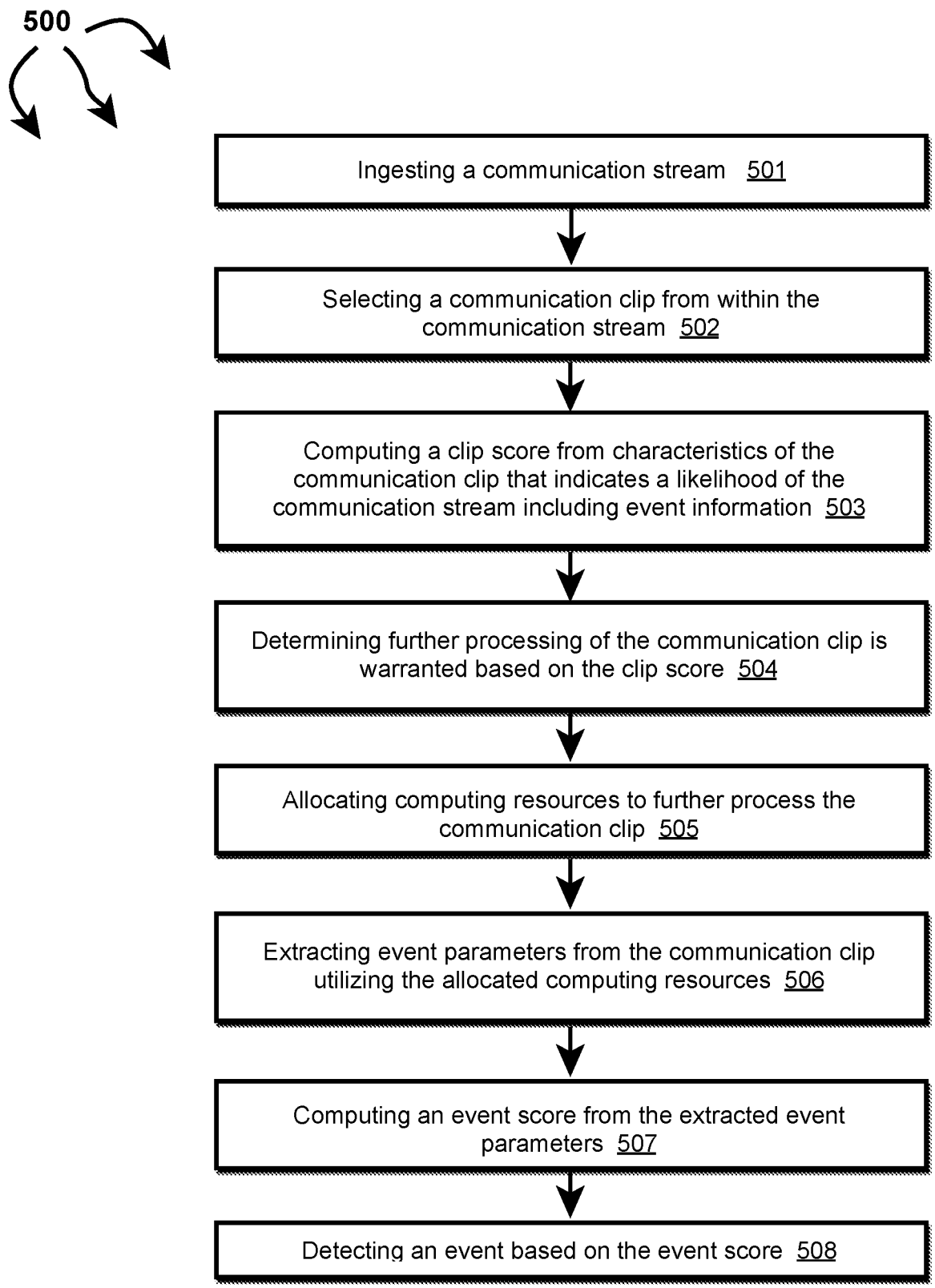
FIG. 5 illustrates a flow chart of an example method for generating an event score from an ingested communication stream.

FIG. 5 illustrates a flow chart of an example method 500 for generating an event score from an ingested communication stream. Method 500 will be described with respect to the components and data depicted in computer architecture 500.

Method 500 includes ingesting a communication stream (501). For example, clip selector 401 can ingest communication signal 421 (e.g., a streaming audio signal) from audio signals 173A. Method 500 includes selecting a communication clip from within the communication stream (502). For example, clip selector 401 can select clip 422 from communication signal 421.

Method 500 includes computing a clip score from characteristics of the communication clip that indicates a likelihood of the communication stream including event information (503). For example, clip score calculator 402 can compute clip score 426 from characteristics of clip 422. Clip score 422 indicates a likelihood of communication signal 421 including event information. In one aspect, sub-clip identifier 403 identifies a sub-clip within the clip 422 with the highest probability of having an event identifier. Clip score calculator 402 analyzes the sub-clip for an event identifier and computes clip score 426 based on the event identifier.

Method 500 includes determining further processing of the communication clip is warranted based on the clip score (504). For example, resource allocator 407 can determine that further processing of communication signal 422 is warranted based on clip score 426 (e.g., exceeding a threshold clip score). Method 500 includes allocating computing resources to further process the communication clip (505). For example, resource allocator 407 can allocate computing resources (e.g., memory resources, processing resources, etc.) to parameter extractor 404 and event score calculator 406

Method 500 includes extracting event parameters from the communication clip utilizing the allocated computing resources (506). For example, parameter extractor 404 extracts parameters 423 from clip 422 utilizing computing resources 427. Method 500 includes computing an event score from the extracted event parameters (507). For example, event score calculator 406 can calculate event score 424 from parameters 423 (utilizing computing resources 427). Event score calculator can be sent to other modules of event detection infrastructure 103.

Method 500 includes detecting an event based on the event score (508). For example, event detection infrastructure 103 can detect an event based on events score 424. Entities can be notified of the detected event. The detected event can also provide a basis for rerouting delivery vehicles or performing other actions.

Concurrent Handling of Communication Signals

Figure 8:
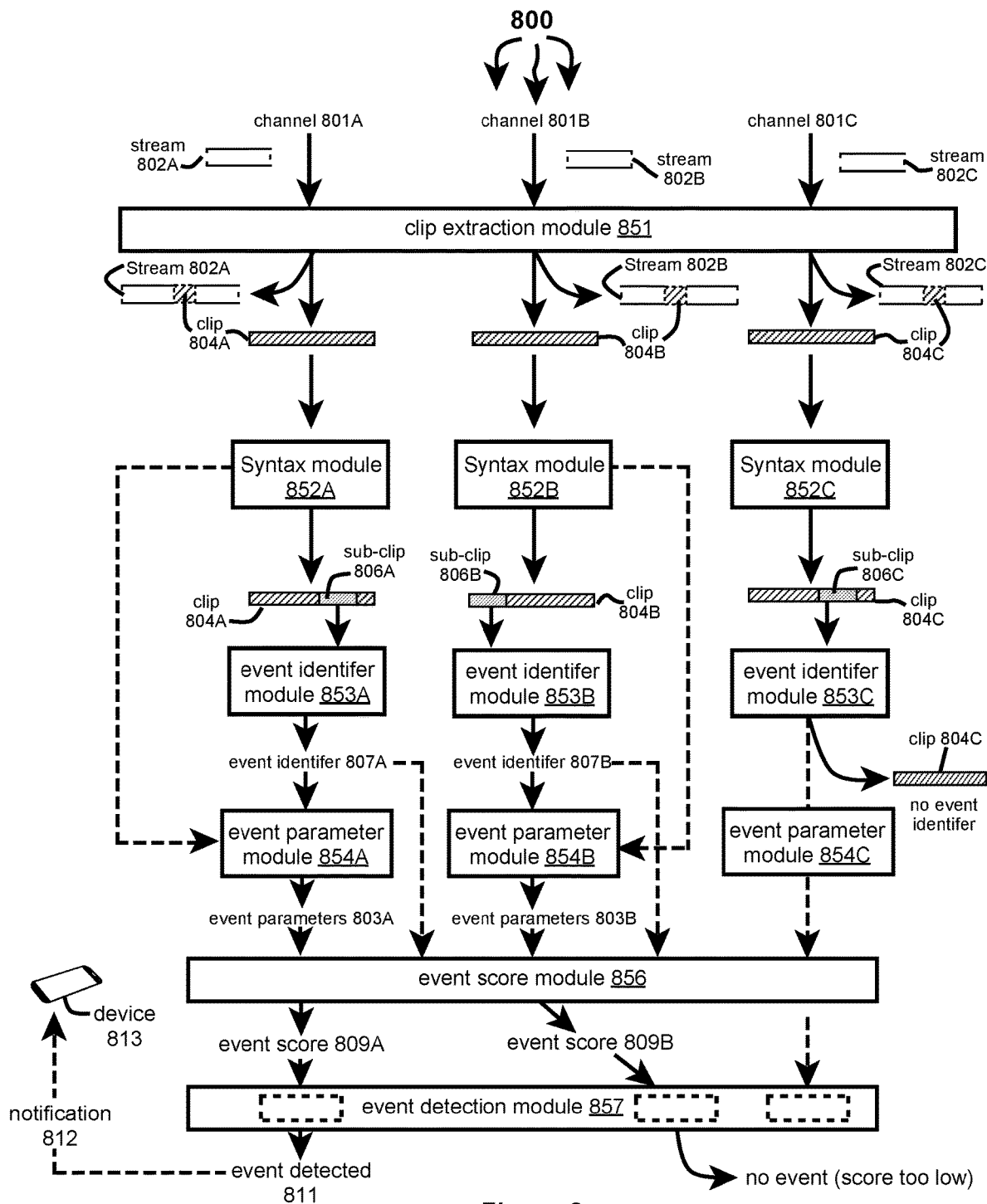
FIG. 8 a computer architecture that facilitates concurrently handling communication signals from a plurality of channels.

FIG. 8 a computer architecture 800 that facilitates concurrently handling communication signals from a plurality of channels. As depicted, computer architecture 800 includes clip extraction module 851, syntax modules 852A, 852B, and 852C, event identifier modules 853A, 853B, and 853C, event parameter modules 854A, 854B, and 854C, event scoring module 856, event detection module 857, and device 813. Clip extraction module 851, syntax modules 852A, 852B, and 852C, event identifier modules 853A, 853B, and 853C, event parameter modules 854A, 854B, and 854C, event scoring module 856, event detection module 857, and device 813 can be included in, integrated with, and/or interoperate with signal ingestion modules 101 (e.g., stream content ingestion modules 176 and stream processing modules 183) and/or event detection infrastructure 103.

Clip extraction module 851 can receive streams 802A, 802B, and 802C from channels 801A, 801B, and 801C respectively. Streams 802A, 802B, and 802C can be included in streaming signals 173. Clip extraction module 851 can extract clips 804A, 804B, and 804C from streams 802A, 802B, and 802C respectively. Syntax modules 852A, 852B, and 852C identify sub-clips 806A, 806B, and 806C from clips 804A, 804B, and 804C respectively.

Sub-clips 806A, 806B, and 806C are locations in clips 804A, 804B, and 804C respectively that are more likely to include event identifiers. Syntax modules 852A, 852B, and 852C can identify sub-clips 806A, 806B, and 806C based on syntax (e.g., 601, 602, etc.) of the geographic location, jurisdiction, corporation, etc. associated with each of channels 801A, 801B, and 801C respectively. Event identifier modules 853A, 853B, and 853C attempt to identify event identifiers in sub-clips 804A, 804B, and 804C respectively. As depicted, event identifier module 853A identifies event identifier 807A and event identifier module 853B identifies event identifier 807B, Event identifier module 853C does not identify an event identifier in sub-clip 806. As such, it is unlikely that clip 804C contains event information. Accordingly, no further computing resources are allocated to process clip 804C.

Further resources can be allocated to event parameter modules 854A and 854B. Event parameter module 854A can extract event parameters 803A from clip 804A using the allocated resources. Similarly, parameter module 854B can extract event parameters 803B from clip 804B using the allocated resources. Event scoring module 856 can compute event score 809A from event parameters 803A. Similarly, event scoring module 856 can compute event score 809B from event parameters 803B.

Event detection module 857 can determine that event score 809B is to low and does not indicate an event (e.g., event score 809B is below an event score threshold). On the other hand, event detection module 857 can detect event 811 based on event score 809A (e.g., event score 809A can exceed the event score threshold). Event detection module 857 can notify 812 device 813 of the occurrence of event 811. Other action can also be taken in response to detecting event 811.

As such, a unified interface can handle incoming signals and content of any kind. The interface can handle live extraction of signals across dimensions of time, location, and context. In some aspects, heuristic processes are used to determine one or more dimensions. Acquired signals can include text and images as well as live-feed binaries, including live media in audio, speech, fast still frames, video streams, etc.

Signal normalization enables the world's live signals to be collected at scale and analyzed for detection and validation of live events happening globally. A data ingestion and event detection pipeline aggregates signals and combines detections of various strengths into truthful events. Thus, normalization increases event detection efficiency facilitating event detection closer to "live time" or at "moment zero".

Communication signals, including streaming audio signals, can be processed in a resource conscious manner to attempt to detect events. When detecting an event from a communication signal is more likely based on partial analysis, additional resources can be allocated for further processing. On the other hand, when detecting an event from a communication signal is less likely based on partial analysis, additional resources are not allocated.

Embodiments of the invention can include any combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

The present described aspects may be implemented in other specific forms without departing from its spirit or essential characteristics. The described aspects are to be considered in all respects only as illustrative and not restrictive. The scope is, therefore, indicated by the appended claims rather than by the foregoing description. All changes which come within the meaning and range of equivalency of the claims are to be embraced within their scope.

What is claimed:

1. A method comprising:
   ingesting data associated with a geographic region;
   computing a first score from a portion of the data, the first score indicating a likelihood of the data including event information related to an event type that occurs with less than a threshold frequency in the geographic region;
   determining further processing of the data is warranted based on the likelihood indicated by the first score;
   allocating computing resources to further process the data;
   extracting parameters from the data portion utilizing the allocated computing resources;
   computing a second score from the extracted parameters utilizing the allocated computing resources; and
   detecting a previously unidentified event of the event type in the geographic area based on the second score.

2. The method of claim 1, wherein ingesting data comprises ingesting a sensor data stream from a sensor selected from among: an air quality sensor or a smart city sensor.

3. The method of claim 1, further comprising identifying the data portion including:
   detecting a beginning condition in the data; and
   detecting an ending condition in the data.

4. The method of claim 3, wherein identifying the data portion comprises stitching different parts of the data together into a conversation.

5. The method of claim 1, wherein ingesting data comprises ingesting one of:
   a communication stream, a video stream, or an audio stream.

6. A system comprising:
   a processor;
   system memory coupled to the processor and storing instructions configured to cause the processor to:
   ingest data associated with a geographic region;
   computing a first score from a portion of the data, the first score indicating a likelihood of the data including event information related to an event type that occurs with less than a threshold frequency in the geographic region;
   determine further processing of the data is warranted based on the likelihood indicated by the first score;
   allocate computing resources to further process the data;
   extract parameters from the data portion utilizing the allocated computing resources;
   compute a second score from the extracted parameters utilizing the allocated computing resources; and
   detect a previously unidentified event of the event type in the geographic area based on the second score.

7. The system of claim 6, wherein instructions configured to ingest data comprise instructions configured to ingest a sensor data stream from a sensor selected from among: an air quality sensor or a smart city sensor.

8. The system of claim 6, further comprising instructions configured to identify the data portion including:
   detect a beginning condition in the data; and
   detect an ending condition in the data.

9. The system of claim 8, wherein instructions configured to identify the data portion comprise instructions configured to stitch different parts of the data together into a conversation.

10. The system of claim 6, wherein instructions configured to ingest data comprise instructions configured to ingesting one of: a communication stream, a video stream, or an audio stream.

11. A method comprising:
ingesting an audio stream;
computing a first score from a portion of the audio stream, the first score indicating a likelihood of the audio stream including event information related to an event type;
determining further processing of the audio stream portion is warranted based on the likelihood indicated by the first score;
allocating computing resources to further process the audio stream portion;
computing a second score from parameters of the audio stream portion utilizing the allocated computing resources; and
detecting a previously unidentified event of the event type based on the second score.

12. The method of claim 11, wherein computing a first score comprises computing a first score indicating a likelihood of the audio stream including event information related to an event type that occurs with less than a threshold frequency.

13. The method of claim 11, wherein computing a first score comprises computing a first score indicating a likelihood of the audio stream including event information related to an event type occurring within a geographic region; and
wherein detecting a previously unidentified event comprises detecting a previously unidentified event within the geographic region.

14. The method of claim 11, wherein identifying the audio stream portion comprises:
detecting a beginning condition in the audio stream; and
detecting an ending condition in the audio stream.

15. The method of claim 14, wherein identifying the audio stream portion comprises stitching different parts of the audio stream together into a conversation.

16. A system comprising:
a processor;
system memory coupled to the processor and storing instructions configured to cause the processor to:
ingest an audio stream;
compute a first score from a portion of the audio stream, the first score indicating a likelihood of the audio stream including event information related to an event type;
determine further processing of the audio stream portion is warranted based on the likelihood indicated by the first score;
allocate computing resources to further process the audio stream portion;
compute a second score from parameters of the audio stream portion utilizing the allocated computing resources; and
detect a previously unidentified event of the event type based on the second score.

17. The computer system of claim 16, wherein instructions configured to compute a first score comprise instructions configured to compute a first score indicating a likelihood of the audio stream including event information related to an event type that occurs with less than a threshold frequency.

18. The computer system of claim 11, wherein instructions configured to compute a first score comprise instructions configured to compute a first score indicating a likelihood of the audio stream including event information related to an event type occurring within a geographic region; and
wherein instructions configured to detect a previously unidentified event comprise instructions configured to detect a previously unidentified event within the geographic region.

19. The computer system of claim 16, wherein instructions configured to identify the audio stream portion comprise instructions configured to:
detect a beginning condition in the audio stream; and
detect an ending condition in the audio stream.

20. The computer system of claim 19, wherein instructions configured to identify the audio stream portion comprise instructions configured to stitch different parts of the audio stream together into a conversation.

* * * * *